(12) United States Patent
McDaid et al.

(10) Patent No.: US 10,853,732 B2
(45) Date of Patent: Dec. 1, 2020

(54) CONSTRUCTING NEW FORMULAS THROUGH AUTO REPLACING FUNCTIONS

(71) Applicant: Microsoft Technology Licensing, LLC, Redmond, WA (US)

(72) Inventors: Joseph John McDaid, Seattle, WA (US); Johnny S. Campbell, Woodinville, WA (US); Benjamin Edward Rampson, Woodinville, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 909 days.

(21) Appl. No.: 15/199,514

(22) Filed: Jun. 30, 2016

(65) Prior Publication Data
US 2018/0005122 A1 Jan. 4, 2018

(51) Int. Cl.
*G06N 5/04* (2006.01)
*G06F 40/18* (2020.01)
(Continued)

(52) U.S. Cl.
CPC ............... *G06N 5/04* (2013.01); *G06F 40/18* (2020.01); *G06N 7/005* (2013.01); *G06Q 10/06* (2013.01); *G06Q 10/10* (2013.01)

(58) Field of Classification Search
CPC ............... G06F 17/2045; G06F 17/246; G06F 17/2288; G06Q 10/10; G06Q 10/06; G06N 5/04; G06N 7/005
See application file for complete search history.

(56) References Cited

U.S. PATENT DOCUMENTS 5,241,620 A 8/1993 Ruggiero
5,603,021 A * 2/1997 Spencer ................. G06F 40/18
(Continued)

FOREIGN PATENT DOCUMENTS

WO 2014035773 A1 3/2014
WO 2016075512 A1 5/2016

OTHER PUBLICATIONS

Tanner, et al., "Formatting by Demonstration: An Interactive Machine Learning Approach", In International Journal of Computer Applications, vol. 86, No. 18, Jan. 2014, pp. 41-47.
(Continued)

*Primary Examiner* — Quoc A Tran
(74) *Attorney, Agent, or Firm* — NovoTechIP International PLLC

(57) ABSTRACT

Aspects of the present disclosure relate to systems and methods for automatically constructing a new formula based upon an existing formula. Various methods are employed to analyze an existing formula in order to determine an intent. Once the intent is determined, a new formula may be constructed that satisfies the intent of the existing formula. Further aspects relate to validating the new formula to ensure it produces the same result as the existing formula which it is intended to replace. Various user interface elements are also disclosed which may be employed to provide the newly constructed formulas to users of an application. The various aspects to disclosed herein may be performed by an application, such as a spreadsheet application, performed in real-time, or provided as a remote service.

17 Claims, 13 Drawing Sheets

(51) Int. Cl.
    *G06N 7/00*    (2006.01)
    *G06Q 10/10*   (2012.01)
    *G06Q 10/06*   (2012.01)
    *G06F 17/00*   (2019.01)

(56) References Cited

U.S. PATENT DOCUMENTS

| | | | |
|---|---|---|---|
| 7,451,397 B2 | 11/2008 | Weber et al. | |
| 7,962,443 B2 | 6/2011 | Krinsky | |
| 9,218,574 B2 | 12/2015 | Phillipps et al. | |
| 2003/0056181 A1 | 3/2003 | Marathe | |
| 2006/0015805 A1* | 1/2006 | Humenansky | G06F 17/246 715/209 |
| 2010/0169759 A1* | 7/2010 | Le Brazidec | G06F 17/246 715/219 |
| 2014/0195466 A1 | 7/2014 | Phillipps et al. | |
| 2014/0372854 A1* | 12/2014 | Otero | G06F 17/246 715/219 |
| 2016/0055139 A1* | 2/2016 | Creason | G06F 40/18 715/217 |

OTHER PUBLICATIONS

"Create or delete a formula", Retrieved on: Jan. 25, 2016 Available at: https://support.office.com/en-us/article/Create-or-delete-a-formula-eb587824-ffa2-4950-b0f1-aa3d53e54873, 7 pgs.

"Google Spreadsheet's Auto-fill", Published on: Mar. 21, 2013 Available at: http://www.techadvisory.org/2013/03/google-spreadsheets-auto-fill/, 2 pgs.

Maguire, Michael., "Google Sheets Programming With Google Apps Script (2015 Revision Complete)", Published on: Sep. 29, 2015 Available at: https://leanpub.com/googlespreadsheetprogramming/read, 68 pgs.

Thorne, et al., "Considering functional spreadsheet operator usage suggests the value of Example Driven Modelling for Decision Support Systems", In Journal of Computing Research Repository, Mar. 2008, pp. 147-158.

Whitmer, Brian C., "Improving Spreadsheets for Complex Problems", In master's thesis Brigham Young University, Aug. 2008, 55 pages.

"Top 10 Tips and Best Practices to Optimize, Speed-Up Excel Formulas", Retrieved From <<https://chandoo.org/wp/2012/03/20/optimize-speedup-excel-formulas/>>, Mar. 20, 2012, 7 Pages.

"FormulaDesk", Retrieved From <<https://web.archive.org/web/20160621234924/www.formuladesk.com/>>, Jun. 21, 2016, 7 Pages.

"International Search Report and Written Opinion Issued in PCT Application No. PCT/US2017/038905", dated Sep. 7, 2017, 11 Pages.

* cited by examiner

FIG. 4

CONSTRUCTING NEW FORMULAS THROUGH AUTO REPLACING FUNCTIONS

BACKGROUND

Formulas and functions utilized by a various application are often long and complicated. Spreadsheet applications, particularly those with many features, often suffer from the problem of new features or new behavior being undiscoverable. Likewise, new features can be hard to adopt for fear of breaking an existing, legacy, spreadsheet solution.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to systems and methods for automatically constructing a new formula based upon an existing formula. A formula may be analyzed to determine an intent of the formula. The new formula may then automatically be constructed based upon the determined intent. Various methods for determining the intent of a formula are disclosed herein. Additional aspects relate to validating a new formula to ensure that it produces the same result as the existing formula it is intended to replace. The validation may be used to generate audit information for display to the user prior to committing the new formula. The various aspects to disclosed herein may be performed by an application, such as a spreadsheet application, performed in real-time, or provided as a remote service.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 4 illustrates an exemplary user interface for providing a newly constructed formula based upon an alternate method for determining intent.

DETAILED DESCRIPTION

Figure 1:
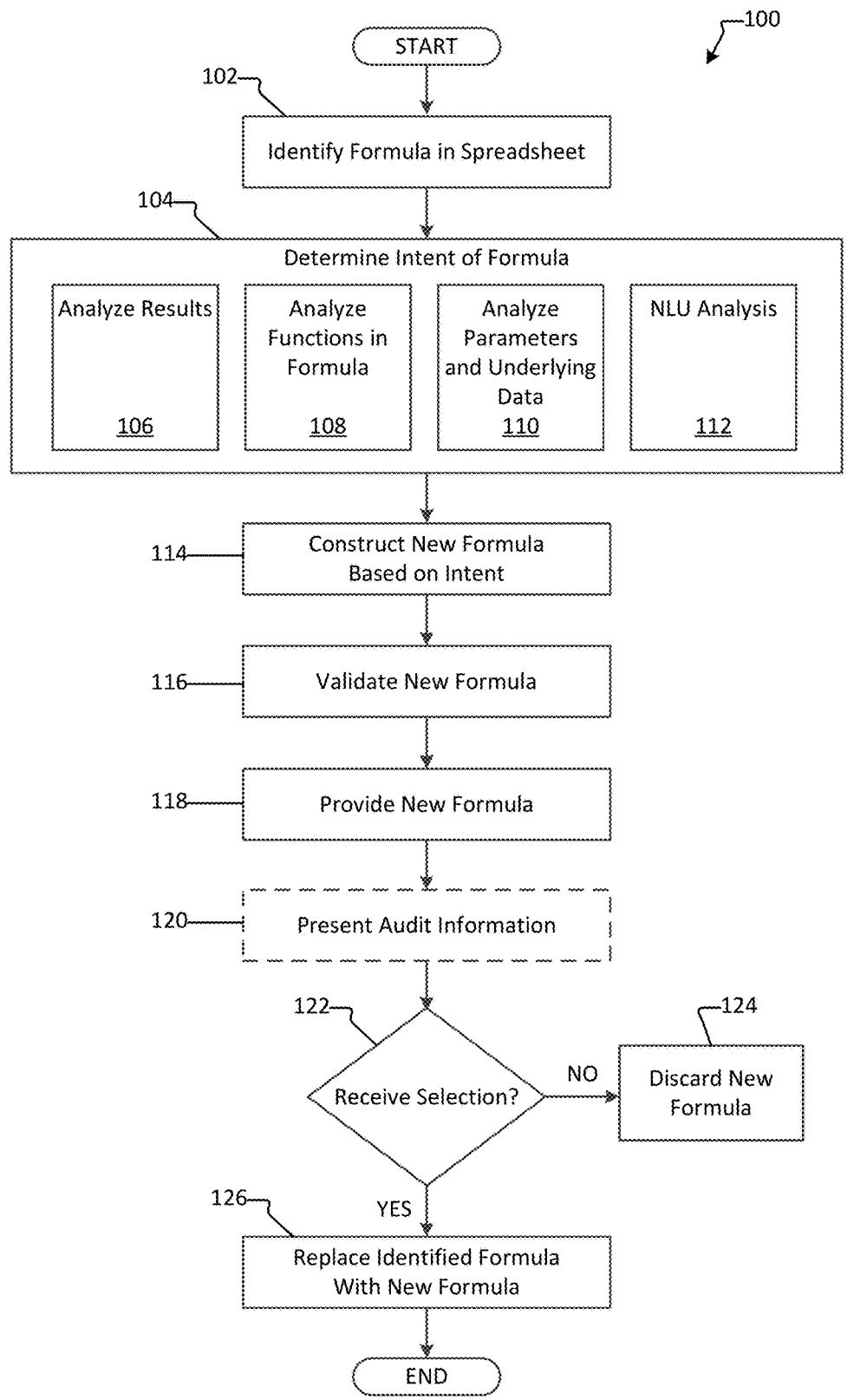
FIG. 1 provides an exemplary method for constructing new formulas based upon user intent.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Formulas and functions utilized by a various application are often long and complicated. Spreadsheet applications, particularly those with many features, often suffer from the problem of new features or new behavior being undiscoverable. Likewise, new features can be hard to adopt for fear of breaking an existing, legacy, spreadsheet solution. Because of this, spreadsheets may continue to use older formulas that are inefficient and, in some cases even deprecated. A number of barriers are in place that prevent the quick adoption of newer, more efficient formulas. One such barrier is the complexity of some of existing formulas. Many users have a difficult time understanding existing formulas and, thus, do not have the knowledge required to craft better formulas. Even if a user understands an existing formula, the user may be unaware of alternate functions and/or data structures that may be used to craft a more readable and more efficient formula.

Aspects of the present disclosure relate to systems and methods for automatically constructing a new formula based upon an existing formula. As used herein, a formula may include one or more functions operating on one or more disparate datasets. While a one-to-one mapping between functions is sometimes possible, due to the complexities of formulas, it is often not possible to simply map the one or more functions in the formula to different functions. In some circumstances, a one-to-one mapping does not exist. In other situations, a formula derived by performing a simple one-to-one mapping may yield an incorrect result. These shortcomings may be addressed by crafting new formulas based upon a determined intent of an existing formula. As used herein, the phrase intent of the formula may refer to the formula's purpose, it's expected results, and/or the results intended by the user who provided the formula (e.g., the user's intent may be associated with the formula).

Aspects disclosed herein relate to analyzing an existing formula in order to determine the intent of the formula. Once the intent is determined, the intent may be used to automatically construct a new formula that satisfies the intent of the original formula. In doing so, there is a high likelihood that the newly constructed formula will behave in the same manner as the original, existing formula. Various methods for determining the intent of a formula are disclosed herein. However, one of skill in the art will appreciate that other methods for determining an event may be employed with the aspects disclosed herein without departing from the spirit of this disclosure.

Various user interface elements are disclosed which may be employed to provide the newly constructed formulas to users of an application, such as a spreadsheet application. While aspects of the disclosure provide for the automatic replacement of existing formulas with the newly constructed formulas, the user interface elements disclosed herein provide users with the opportunity to decide whether or not the existing formula should be replaced. In addition to providing users the ability to control the replacement of the formula, the user interface acts as an instructional tool that capable of teaching users how to create and draft formulas as well as inform the user about functions and data structures that the user might not have been aware of.

Additional aspects relate to validating a new formula to ensure that it produces the same result as the existing formula it is intended to replace. The validation may be used to generate audit information for display to the user prior to committing the new formula. The various aspects to disclosed herein may be performed by an application, such as a local or remote spreadsheet application, performed in real-time, or provided as a remote service. Although examples provided herein may relate to constructing a new formula to represent a single existing formula, one of skill in the art will appreciate that one or more new formulas may be constructed to replace a group of existing formulas. For example, one aspect, a determination may be made that a single formula can satisfy the intent of a group of existing formulas. In such examples, a new formula may be constructed to replace the existing group of formulas. Alternatively, or additionally, a group of new formulas may also be constructed to replace a group of existing formulas.

FIG. 1 provides an exemplary method 100 for constructing new formulas based upon user intent. In aspects, method 100 may be executed on a device comprising at least one processor configured to store and execute operations, programs or instructions. However, method 100 is not limited to such examples. In other examples, method 100 may be performed on an application or service for generating new formulas. In at least one example, method 100 may be executed (e.g., computer-implemented operations) by one or more components of a distributed network, such as a web service/distributed network service (e.g. cloud service). For ease of explanation, the aspects of FIG. 1 are described with respect to operating upon spreadsheet files. However, one of skill in the art will appreciate that the teachings described herein are applicable to other types of files that include formulas.

Method 100 begins at operation 102 were one or more formulas in a spreadsheet file are identified. The spreadsheet file may reside locally on the device performing the method or may reside on a remote device. In one example, a spreadsheet file may be parsed to identify formulas included in the file. Alternatively, or additionally, identification of the one or more formulas may be performed by prompting a user to provide a formula to the application or device performing the method 100. In such examples, the formula may be received via a user interface (UI), such as a graphical user interface (GUI). A formula identified in the spreadsheet file may include one or more functions operating on one or more disparate datasets. While a one-to-one mapping between functions is sometimes possible, due to the complexities of formulas, it is often not possible to simply map the one or more functions in the formula to different functions. In some circumstances, a one-to-one mapping does not exist. In other situations, a formula derived by performing a simple one-to-one mapping may yield an incorrect result. However, these issues may be overcome by determining the intent of the identified formulas.

Flow continues to operation 104 where an intent is determined for an identified formula. The aspects described herein provide a variety of methods that maybe employed to determine an intent of a formula. As an example, intent may be determined by analyzing neighboring formulas. In certain aspects, an intent for a group of formulas may be determined by performing an analysis on formulas identified as being related. In doing so, a single formula (or a group of formulas) may be created based upon the determined intent for an existing group of formulas. As an example, if cells A1, A2, A3 of a spreadsheet contained the value 1 and cells B1, B2, and B3 of the spreadsheet contained the formulas=A1*2, = A2*2, and =A3*2, respectively. Analysis of the formulas for the cells B1, B2, and B3 may determine that the intent of the user was to double the values stored in column A. Based upon the determined intent and as will be discussed in further detail below, a single formula, =A1:A3*2, may be constructed. In the provided example, the formulas in cells B1, B2, and B3 may be replaced by a single array=A1:A3*2 in the cell B1. The type of mechanism employed may be selected based upon the formula and/or underlying data associated with the formula.

In further examples, determining an intent may include analyzing the dependents and precedents of the formula being authored. For example, if the formula being authored is summing a range and so are neighboring cells, and together they are all being summed up by another formula. A determination may then be made, for example, based upon a derived inference, that the intent of the formula was to be a subtotal. In various aspects, analysis of a range size to identify repeated operations applied over each value in a range may be performed. The analysis may determine whether any patterns exist, e.g., an operation is performed on each item in the range (including conditional operations). Other examples of patterns include, but are not limited to, a running calculation (that may or may not maintain state information) on each item in the range (e.g., a running subtotal), and/or a transformation on the entire range. That is, aspects disclosed herein may identify intent based upon generic patterns such as mapping a formula/function/expression over an entire range (applying to each value, either with or without conditions). As such, by identifying a general pattern of how the logic is applied to a set and determining what the functions applied to the set are intended to do, one or more intents may be determined that may be used to refactor, or replace, existing formulas with newly constructed formulas.

A single method may be employed to determine an intent. Alternatively, a number of the exemplary methods may be employed simultaneously or in parallel to determine an intent. While exemplary methods for determining an intent are disclosed herein, one of skill in the art will appreciate that other methods of determining intent may be employed by the aspects disclosed herein without departing from the scope of this disclosure. In certain aspects, the formulas may be parsed or tokenized to identify various different components. The different components may be analyzed individually and/or in combination to determine an intent for the formula. Additional methods for determining an intent are provided throughout this disclosure.

The analyze result operation 106 may be employed to determine the intent of a formula. In one aspect, the formula may be computed to determine a result. The result may then be analyzed to identify characteristics. For example, characteristics such as a result type (e.g., numerical, text, complex type), result location (e.g., the placement of the result relative to other results or data), result values, and the like may be determined by analyzing the result. The identified characteristics may then be used to determine an intent. As an example, consider the formula vlookup(F2, A1:C5,1). The exemplary formula may operate on the exemplary data shown in FIG. 4. Analyze result operation 106 may compute the formula to determine that the result is "Sam." The result type is a string. By comparing the result type to the related data, namely, the values stored in the range A1:C5, the analyze result operation 106 may determine that the intent of the exemplary formula is to identify or filter a name.

The analyze function operation 108 may be employed to determine the intent of a formula. As previously noted, the formula may include one or more functions. Analyze function operation 108 may analyze the one or more functions individually and/or in combination in order to identify characteristics of the one or more functions. Exemplary characteristics that may be determined are a type of the function, the output of the function(s) individually and/or in combination, the types of parameters required by the function(s), the values of the parameters received by the function(s), and the like. These characteristics may be used to determine an intent. For example, the characteristics of the function or functions may be used to determine a logical equivalent of the functions individually and/or in combination. The logical equivalence of a formula's function(s) may be used to determine an intent. For example, the logical equivalence of a series of nested conditional operations may be filter function. In other words, the determined intent is to find a single, or set, of values that match a certain criteria or collection of criteria.

The analyze underlying data operation 110 may be employed to determine an intent for a formula. It may be possible to determine the intent of a formula based upon the underlying data because the operations performed by the formula and result generated by the formula are restricted based upon the underlying data. For example, if the underlying data is an array of values, then it may be determined that the intent of the formula is to perform an arithmetic action using the values. As such, the underlying data that the formula operates on may be used to determine an intent.

A natural language understanding (NLU) analysis operation 112 may also be employed to determine an intent. In some circumstances, the formula may be expressed using a natural language. For example, the formula may be expressed as "sum the values of column B." If the formula is provided in this manner, a NLU analysis may be performed in order to interpret the intent of the formula. NLU analysis operation 112 may employ a language understanding model, such as the type of language models commonly employed by speech recognition applications, in order to determine the meaning of the expression. The meaning of the expression may then be analyzed to determine an intent for the formula. Alternatively, or additionally, NLU analysis operation 112 may be performed on other data such as underlying data, the result of a function, and the like to determine an intent.

Once the intent has been determined, flow continues to operation 114. At operation 114, the determined intent is used to construct a new formula. For example, one or more new functions that satisfy the intent may be selected and combined into a new formula. Optimization considerations may also be taken into account when selecting the new formula(s). For example, a goal of the various aspects disclosed herein is to increase readability of the formulas, thereby making it easier for the user to understand and/or modify the spreadsheet. As such, even if the new formula(s) satisfies the intent of the formula identified at operation 102, if the new formula is not as readable, e.g., it is less succinct or more complicated, the new formula may not be constructed. Alternatively, or additionally, a goal of the various aspects disclosed herein may be performance optimization. As such, even if a new formula that satisfies the intent of the identified formula can be constructed, if the new formula is more computationally or resource intensive, the new formula may not be constructed.

Alternatively, or additionally, construction of a new formula at operation 114 may also include modifying underlying data associated with the function identified at operation 102. In example, the underlying data may be modified to increase readability of the spreadsheet, for optimization purposes, and/or to avoid potential future errors. As such, in addition to identifying new functions, new parameters for the functions may be constructed and/or identified at operation 114. As an example, the original function identified at operation 102 may receive a grid of values as a parameter. A determination may be made at operation 114 that a table or an array may provide a better representation of the input values. As such, operation 114 may include creating an array or table representation of the original parameter. The newly created data structure may then be included as a parameter for the newly constructed formula. In certain aspects, creation of the new data structure may also include modifying the underlying data in order to convert the underlying data into a new data structure. As discussed with respect to the identification of new formulas, readability and/or performance optimization factors may be considered when creating new data structures at operation 114.

In addition to creating new formulas, new data structures may be created that define portions of the formula. For example, a name or a variable may be created for parts of formulas that are often repeated in a single formula or across multiple formulas. For example, if a complex statement is used frequently, a name that represents the complex statement may be created that has a value equal to that of the complex statement. The instances of the complex statement may then be replaced, both within a single formula and across multiple formulas, with the newly created name. This may result in the creation of more readable formulas.

In one aspect, one new formula may be constructed at operation 114. In other aspects, more than one formula may be constructed. After constructing the new formula(s), flow continues to operation 116 where the new formula(s) are validated. One aspect of validating the newly created formula may include evaluating both the formula identified at operation 102 and the newly created formula. The results of the evaluations may be compared. If the results are the same, the newly created formula is valid. If the results differ, the newly created formula is invalid and may be discarded. Alternatively, or additionally, validating the newly created formula may comprise evaluating the readability of the formula. As previously noted, if the newly created formula is not as readable (e.g., not as succinct, easy to understand, and/or easy to manipulate) than the originally identified formula, the newly created formula may not be validated. Evaluation of the readability may include parsing both the newly created formula and the originally identified formula to calculate a readability scores. The readability scores may be compared in order to determine whether the newly created formula is more readable than the originally identified formula. In still further aspects, validation of the newly created formula may be based upon performance metrics. The newly compared formula may be executed and performance metrics can be collected during execution. Performance metrics may include, but are not limited to, the amount of time required to execute the formula, the amount of CPU cycles required, the amount of memory or other resources required, the number of disk reads, etc. The performance metrics for the newly created formula can be compared to performance metrics for the originally identified formula. If the newly created formula outperforms the original formula, the newly created formula may be validated. In certain aspects, the validation operation 116 may performed using a service, such as a cloud network service. Doing so allows the validation to be performed by a machine other than a client device that's operating the application which contains the formula. As such, if cost of computation is an issue, the computational costs may be offloaded to another device thereby ensuring that the user of a client device does not experience performance degradation that may result by performing the validation operation 116 locally.

Figure 2:
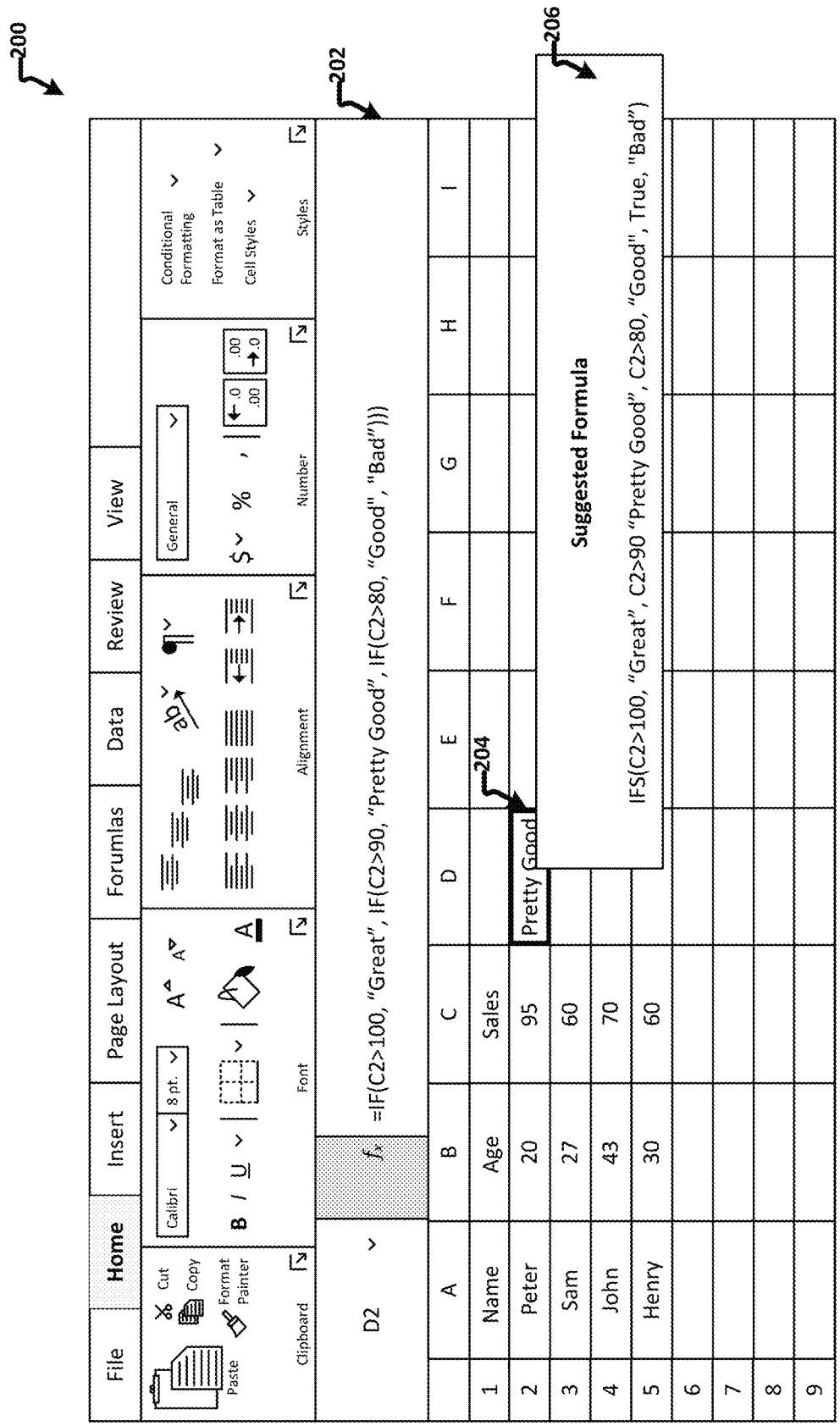
FIG. 2 illustrates an exemplary user interface for providing a newly constructed formula based upon an exemplary method for determining intent.
Figure 3:
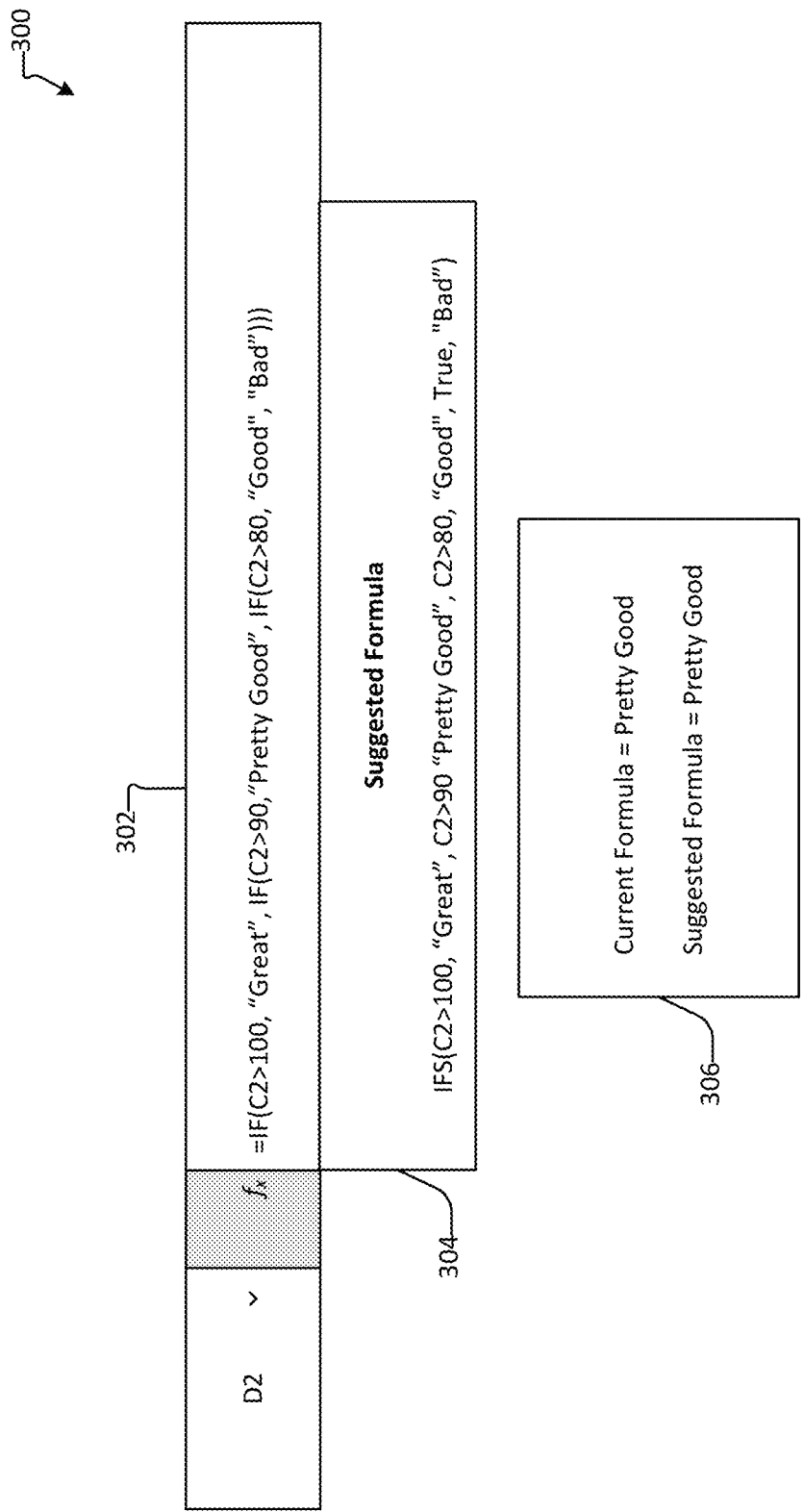
FIG. 3 illustrates an exemplary portion of user interface for providing a newly constructed formula based up intent.

Upon validating the newly created formula(s), flow continues to operation 118 where the validated formulas are provided. In one aspect, providing the validated formula(s) may comprise automatically replacing the original formula with the newly created formula. However, aspects of the present disclosure provide the opportunity to educate users about alternate ways of constructing formulas. As such, it may be beneficial to display the newly constructed formula to the user. Displaying the newly constructed formula to the user provides an opportunity to educate the user about functions, data structures, and/or formula structures that the user might not have known. As such, providing the formula(s) at operation 116 via the spreadsheet UI. In one aspect, a callout UI may be presented displaying the newly presented formula, as illustrated in FIG. 2. In another aspect, the newly created formula may be presented in a drop down list located below the spreadsheet's formula bar, as illustrated in FIG. 3. Displaying the formula may comprise displaying the new created formula by itself or displaying the formula with additional information describing the functions and/or data structures of the new formula.

Flow continues to optional operation 120 where audit information may be presented with the new formula. Audit information may be information proving that the new formula performs the same functionality and/or provides the same functionality as the original formula. In one aspect, presenting audit information may include presenting the results obtained by executing the new formula and the original formula in a manner that allows the user to compare the results.

In aspects where the new formula is presented to the user, the new formula may not be committed without user consent. Flow continues to decision operation 122 where a determination is made as to whether the new formula was selected. The determination may be based upon whether or not input has been received that indicates the selection of the new formula. The selection may be received via a graphical user interface. For example, if the newly created formula presented to the user is selected using a mouse, a keyboard, a touch interface, or any other type of interface, a determination is made the newly created formula was selected. However, if a predetermined amount of time has passed without receiving the selection, the user performs another action before selecting the new formula, or the user explicitly denies the new formula, a determination may be made that the new formula was not selected. In certain aspects, information about whether or not a formula is selected may be stored and analyzed by a machine learning algorithm to capture the intent analysis described herein, along with which newly constructed formulas are accepted or rejected over time. The machine learning algorithm may use such information to continually adjust and fine tune the methods and models disclosed herein. If the new formula was not selected, flow branches NO to operation 124 and the new formula is discarded. However, it is determined that the new formula is selected, flow branches YES to operation 126. At operation 126, the new formula committed. Committing the new formula may include replacing the old formula with the new formula. The new formula may then be saved with the spreadsheet. In an alternate aspect, committing the new formula(s) may comprise creating a copy of the file with the formula, e.g., creating a copy of the spreadsheet, that includes the newly created formula. This allows the user to later revert to the existing formula(s) if desired. In various aspects, changes to a spreadsheet may be saved internally as a sequence of revisions, or operations, done to that sheet or cell. The changes may be stored in memory or persisted to a secondary storage, thereby allowing a user to revert to the original formula(s).

FIG. 2 illustrates an exemplary user interface 200 for providing a newly constructed formula based upon an exemplary method for determining intent. User interface 200 is an exemplary interface for a spreadsheet application. User interface 200 includes a formula bar 202. Formula bar 202 displays an identified formula for the D2 cell. The formula displayed in formula bar D2 may be an original formula that is identified by the device performing the methods disclosed herein. For example, the formula identified in D2 may be identified during operation 102 of FIG. 1. The following formula is displayed in formula bar 202: IF(C2>100, "Great", IF(C2>90, "Pretty Good", IF(C2>80, "Good", "Bad"))). Specifically, the formula displayed in formula bar 202 compares the value stored in in the cell C2 to three different values. If the value in C2 is greater than 100, the string "Great" is returned by the formula. If the value in C2 is greater than 90 but less than 100 the string "Pretty Good" is returned by the formula. If the value in C2 is greater than 80 but less than 90 the string "Good" is returned by the formula. Finally, if the value in C2 is less than 80, the string "Bad" is retuned. The D2 cell 204 is populated with the returned value. As illustrated in FIG. 2, cell D2 204 is populated with the string "Pretty Good."

As discussed with respect to FIG. 1, the intent of the displayed in formula bar 202 may be determined. In the depicted example, the intent of the original formula may be determined based upon an evaluation of the original formula's functions. The original formula displayed in formula bar 202 comprises a series of nested IF functions. By analyzing the nested IF functions, the aspects disclosed herein can determine that the intent of the formula is to assign a value based upon the value present in the C2 cell. Once the intent is identified, a logically equivalent function that satisfies the original formula's intent. In the depicted example, a determination is made that the IFS function is the logical equivalent of the nested IF functions and, therefore, is capable of satisfying the intent of the original formula. As such, a new formula, IFS(C2>100, "Great", C2>90"Pretty Good", C2>80, "Good", True, "Bad"), may automatically be constructed by the aspects disclosed herein. In the depicted example, the newly created formula is displayed in the suggestion box 206. In the illustrated user interface 200, the suggestion box 206 is a hovering UI element intended to draw attention to the newly created format. The selection box 206 may be operable to receive a selection. That is, the selection box 206 may be selected using a mouse, a keyboard, or other input interface. Alternatively, or additionally, the newly created formula may be directly selected by the user clicking on the formula or otherwise using an input to select the formula. Although not displayed in FIG. 2, upon receiving a selection of the new formula, original formula displayed in formula bar 202 may be replaced with the new formula displayed in suggestion box 206.

Thus far, the examples provided herein relate to replacing an existing formula or a group of existing formulas with a newly created formula. In further examples, however, a group of newly created formulas may be created to replace a single existing formula. When dealing with a large or complex formula a determination may be made that existing formula (or group of formulas) would perform better (e.g., more efficiently, display higher readability) if it was split into a number newly created sub-formulas. For example, the following is an exemplary formula that tries to combine the text in A1:A10 so that it can be sent via SMS:

$$D1:=IF(LEN(CONCAT(A1:A10))>160,LEN(CONCAT(A1:A10))-160\&\text{"too many"},CONCAT(A1:A10))$$

In the above example, the formula may reside in cell D1. Upon determining the intent, that is, to combine text to send via SMS, a group of new sub-formulas may be constructed that satisfies the intent. The following sub-formulas may be constructed in order to satisfy the intent.

$$D1:=CONCAT(A1:A10)$$

$$D2:=LEN(D1)$$

$$D3:=160$$

$$D4:=IF(D2>D3,D2-D3\&\text{"too many"},D1)$$

As such, further aspects of the present disclosure provide the ability to create a group of sub-formulas to replace a single existing formula. In further examples, a group of sub-formulas may also be created to replace a group of existing formulas.

The exemplary group of sub-formulas results in a grouping of interim or linked cells. In further aspects, the linked cells may be assigned a name or label. Assigning the cells a name or label may result in improved formula legality. As an example, the cell D1 may be named or labeled 'CombinedText', D2 may be named or labeld 'LengthOfCombinedText', D3 may be named or labeled 'CharacterLimit', and D4 may be named or labeled 'SMSText'. Upon assigning these labels, the generated sub-formulas could use the assigned names instead of the cell references. In doing so, the formula in cell D4 could be replaced with the following exemplary formula:

```
=IF(LengthOfCombinedText> CharacterLimit,
   LengthOfCombinedText-CharacterLimit &"too
   many",CombinedText)
```

As such, by assigning labels to a cell or a formula, new formulas may be constructed with significantly increased readability. The increased readability may make it easier for a user to understand a formulas purpose and/or functionality. In still further examples, The formula could also be encapsulated in a reusable user defined function, so the contents of D1 might simply be replaced with =TEXT_TO_SMS(A1: A10) and the logic stored elsewhere for example, in a spreadsheet workbook or metadata.

FIG. 2 provides an exemplary user interface 200 that may be employed with the various aspects disclosed herein.

While user interface 200 illustrates specific original and newly created formulas, one of skill in the art will appreciate that the depicted formulas are for the purposes of illustration only and the aspects disclosed herein are not limited by the depicted formulas. Furthermore, the discussion regarding the determination of an intent for the original formula displayed in formula bar 202 is but one example of how a formula's intent may be determined. Other methods for determining intent such as, for example, the other methods discussed with respect to FIG. 1, may be employed without departing from the scope of this disclosure. Additionally, while user interface 200 includes specific user interface elements, the specific elements are for illustrative purposes only and should not be construed as limiting. Other aspects in accordance with this disclosure may provide a user interface having a different look and/or including different elements than user interface 200.

FIG. 3 illustrates an exemplary user interface 300 for providing a newly constructed formula based up intent. The exemplary user interface 300 includes a formula bar 302. Similar to formula bar 202 of FIG. 2, formula bar 302 includes the original formula IF(C2>100, "Great", IF(C2>90, "Pretty Good", IF(C2>80, "Good", "Bad"))). However, instead of a suggestion box, FIG. 3 depicts a drop down menu 304 attached to formula bar 302. The drop down menu 304 includes the new formula IFS(C2>100, "Great", C2>90"Pretty Good", C2>80, "Good", True, "Bad") that was derived based upon a determined intent for the original formula. The drop down menu 304 is operable to receive a selection via an input interface, such as a keyboard, a mouse, a touchscreen, etc. Upon receiving input at drop down menu 304, the original formula displayed in formula bar 302 may be replaced by the suggested formula displayed in the drop down menu 304.

As previously discussed, audit information may be displayed in addition to the newly created formula. The audit information may be used to confirm that the new formula derives the same result as the original formula. As previously discussed, both the original formula and the new formula may be executed to produce results. User interface 300 includes an exemplary audit element 306 that displays the computed results for both the original and new formula. This allows the user to confirm that the new formula produces the same result as the original formula prior to replacing the original formula with the new formula. While audit element 306 is presented as being a separate element from formula bar 302 and drop down menu 304, one of skill in the art will appreciate that the audit interface may be combined with or otherwise be a part of one of the other user interface elements. While user interface 300 illustrates specific original and newly created formulas, one of skill in the art will appreciate that the depicted formulas are for the purposes of illustration only and the aspects disclosed herein are not limited by the depicted formulas. Additionally, while user interface 300 depicts specific user interface elements, the specific elements are for illustrative purposes only and should not be construed as limiting. Other aspects in accordance with this disclosure may provide a user interface having a different look and/or including different elements than user interface 300.

Figure 4:
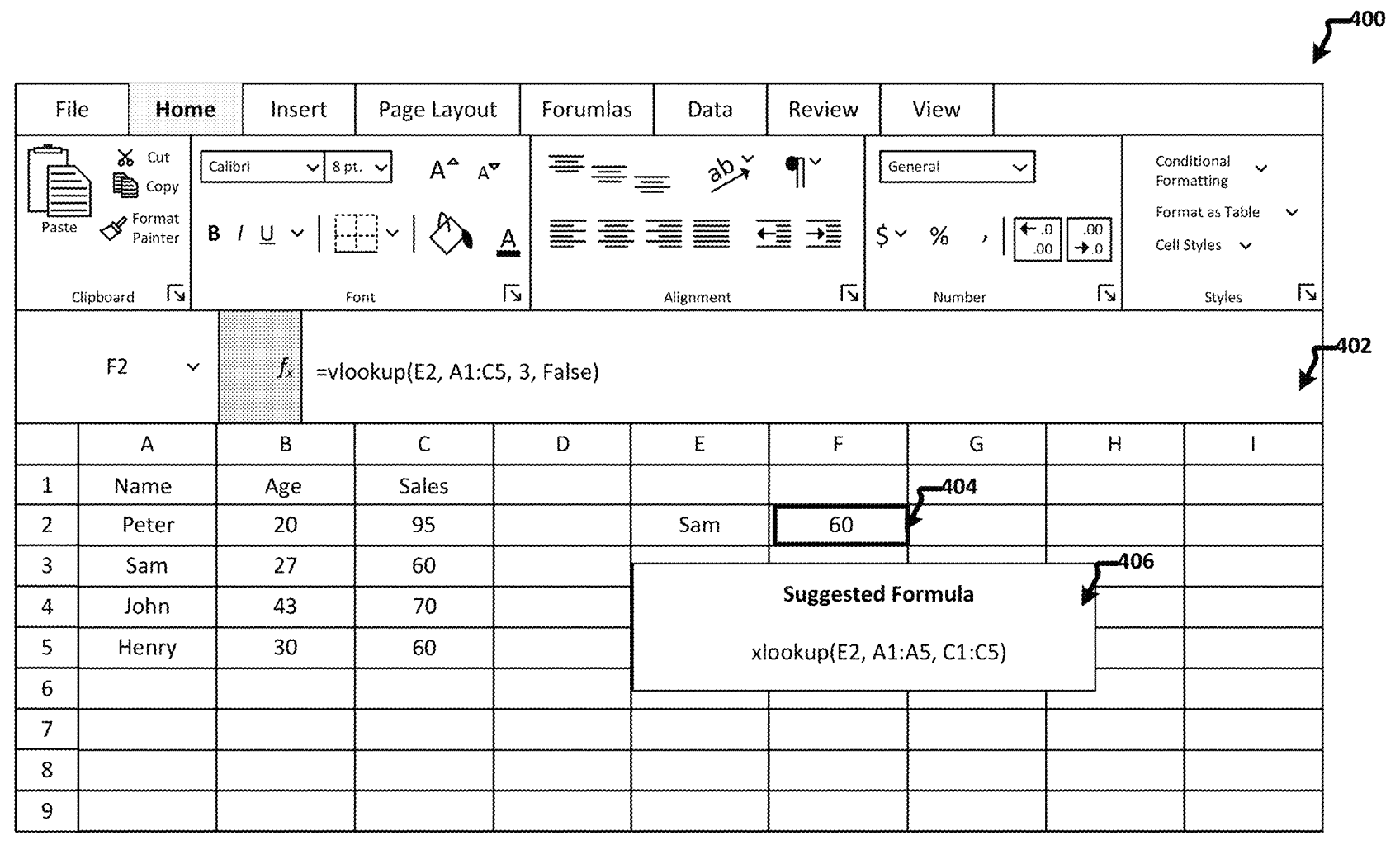

FIG. 4 illustrates an exemplary portion of a user interface 400 for providing a newly constructed formula based upon an alternate method for determining intent. User interface 400 is an exemplary interface for a spreadsheet application. User interface 400 includes a formula bar 402. Formula bar 402 displays an identified formula for the F2 cell. Specifically, the formula bar 402 comprises the following formula:

vlookup(E2, A1:C5, 3, FALSE). The original formula displayed in formula bar 402 does a comparison of the value resident in the cell E2, "Sam" in the displayed example, to find a matching value in the grid of cells spanning A1 to C5. If a match is found, the value in the third column of the grid spanning A1 to C5 is returned. In the above example, the returned value is 60.

In the provided example, the intent of the original formula may be determined by a number of different methods. One such method is by analysis of the arguments. An analysis of the grid or cells spanning A1 to C5 can be used to determine that the grid is a representation of a table. The parameter "3" received by the original formula can be analyzed to determine that the intent is to return "Sales" data from a row matching the search parameter "Sam." Furthermore, a determination may be made that the search parameter E2 is a "Name." As such, a determination may be made that the intent of the function is to return the number of sales for a particular person, namely "Sam" in the example. Upon determining the intent, a new formula, xlookup(E2, A1:A5, C1:C5), may be generated. The generated formula makes use of the hypothetical XLOOKUP function that accepts the following arguments: i) what to search for ii) where to search for it and iii) the corresponding value to return as a result. In addition to modifying the function, the new formula changes the structure of the parameters to treat the original formula's Grid of cells like a table, which is what the grid actually represents. In this example, the reformulation provides a number of optimizations. The original formula would have to be reevaluated upon a change to any cells in the grid A1 to C5. As such, any change in the "Age" column, which has not impact upon the intent of the formula, would require a recalculation of the original formula. In the new formula, however, the "Age" column is not a factor. Thus, unlike the original formula, the new formula is not recalculated upon a change in age data.

In the depicted example, the newly created formula is displayed in the suggestion box 406. In the illustrated user interface 400, the suggestion box 406 is a hovering UI element intended to draw attention to the newly created formula. The selection box 406 may be operable to receive a selection. That is, the selection box 406 may be selected using a mouse, a keyboard, or other input interface. Alternatively, or additionally, the newly created formula may be directly selected by the user clicking on the formula or otherwise using an input to select the formula. Although not displayed in FIG. 4, upon receiving a selection of the new formula, original formula displayed in formula bar 402 may be replaced with the new formula displayed in suggestion box 406.

FIG. 4 provides an exemplary portion of a user interface 400 that may be employed with the various aspects disclosed herein. While user interface 400 illustrates specific original and newly created formulas, one of skill in the art will appreciate that the depicted formulas are for the purposes of illustration only and the aspects disclosed herein are not limited by the depicted formulas. Furthermore, the discussion regarding the determination of an intent for the original formula displayed in formula bar 402 is but one example of how a formula's intent may be determined. Other methods for determining intent such as, for example, the other methods discussed with respect to FIG. 1, may be employed without departing from the scope of this disclosure. Additionally, while user interface 400 includes specific user interface elements, the specific elements are for illustrative purposes only and should not be construed as limiting. Other aspects in accordance with this disclosure may provide a user interface having a different look and/or including different elements than user interface 400.

Figure 5:
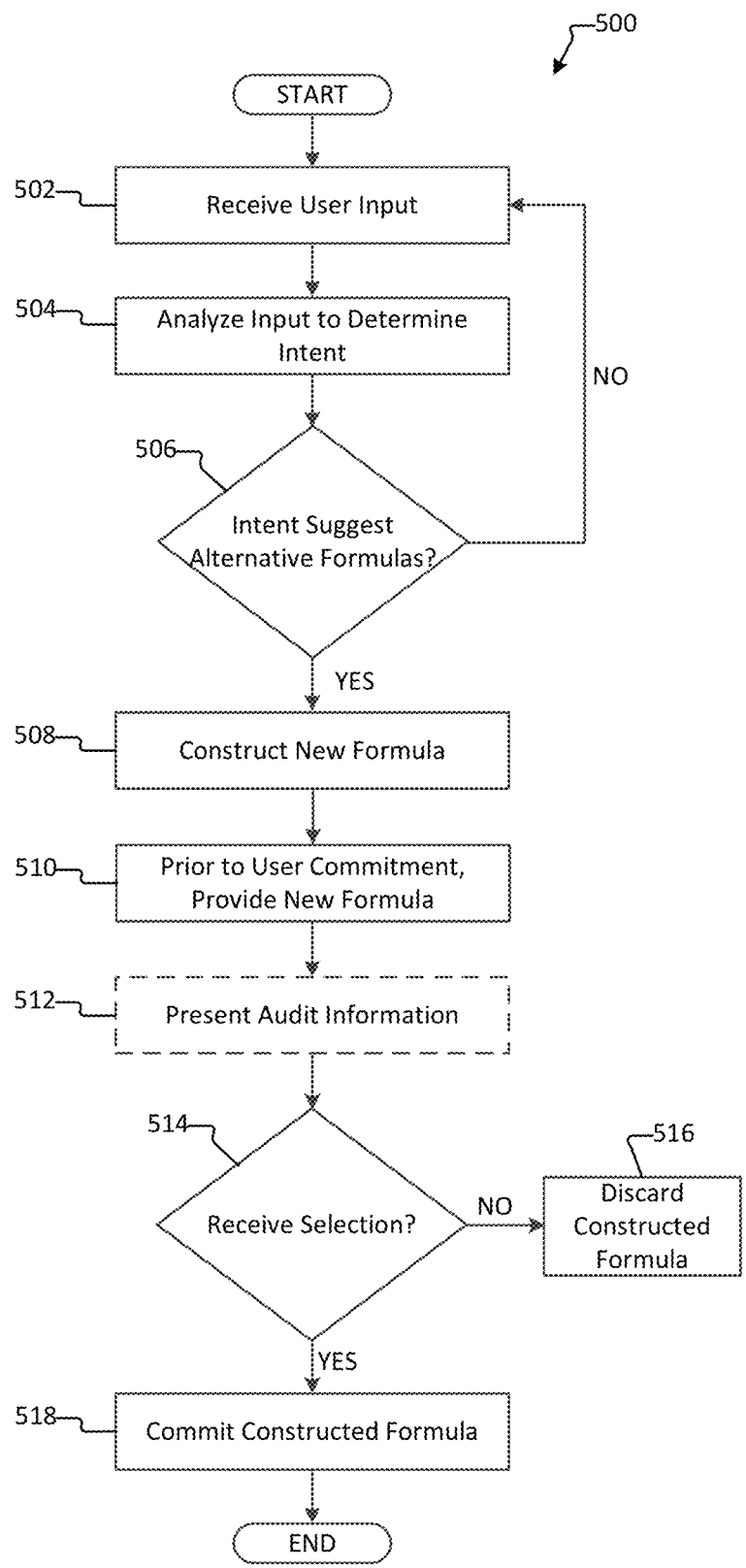
FIG. 5 provides an exemplary method for providing a newly constructed formula in real-time.

FIG. 5 provides an exemplary method 500 for providing a newly constructed formula in real-time. In aspects, method 500 may be executed on a device comprising at least one processor configured to store and execute operations, programs or instructions. However, method 500 is not limited to such examples. In other examples, method 500 may be performed on an application or service for generating new formulas. In at least one example, method 500 may be executed (e.g., computer-implemented operations) by one or more components of a distributed network, such as a web service/distributed network service (e.g. cloud service). For ease of explanation, the aspects of FIG. 5 are described with respect to operating upon spreadsheet files. However, one of skill in the art will appreciate that the teachings described herein are applicable to other types of files that include formulas.

Flow begins at operation 502 where user input is received. User input may be received via a variety of different interfaces. For example, user input may be received via a keyboard or a mouse, via a speech recognition engine, via a touchscreen, etc. In one example, the input may be received via a graphical user interface component, such as, for example, a formula bar of a spreadsheet application. Flow continues to operation 504 where an intent is determined for the received input. In examples, the intent may be determined using the methods previously discussed with respect to FIG. 1. However, while FIG. 1 describes determining an intent for a complete formula, operation 504 determined intent as input defining the formula is received. As an example, operation 504 determines intent as a user types in a formula. As such, operation 504 is operable to determine the intent of an incomplete formula. Flow continues to decision operation 506 where a determination is made as to whether an intent has been determined for the partial formula. If an intent has not been determined, flow branches NO and returns to operation 502 where additional input is received and the method continues.

If an intent is determined for the partial formula, flow branches YES to operation 508 where a new formula is constructed based upon the determined intent. Construction of a new formula based upon intent is described with respect to operation 114 of FIG. 1. However, because the original formula is only partially complete, the newly constructed formula may also be only partially complete. The newly created formula may be updated as additional input is received from the user. Flow continues to operation 510 where the newly constructed formula may be provided to the user. The newly constructed formula may be provided prior to the commitment of the original formula defined by the input received at operation 502. In one aspect, the newly constructed formula may be provided in a drop down menu attached to the formula bar of a spreadsheet application. Alternatively, the newly constructed formula may be provided as an autocomplete option. Input for the original formula may continue to be received as the new formula is provided. The received input may automatically be updated and included in the new formula provided at operation 510. For example, if input indicating additional arguments for a function is received, the newly created formula provide at operation 510 may be updated to include the additional arguments.

Flow continues to optional operation 512 where audit information may be presented with the new formula. Audit information may be information proving that the new formula performs the same functionality and/or provides the same functionality as the original formula. In one aspect, presenting audit information may include presenting the results obtained by executing the new formula and the original formula in a manner that allows the user to compare the results. The audit results may continue to update as additional input is received.

In aspects where the new formula is presented to the user, the new formula may not replace the original formula without consent. Flow continues to decision operation 514 where a determination is made as to whether the new formula was selected. The determination may be based upon whether or not input has been received that indicates the selection of the new formula. The selection may be received via a graphical user interface. For example, if the newly created formula presented to the user is selected using a mouse, a keyboard, a touch interface, or any other type of interface, a determination is made the newly created formula was selected. However, if a predetermined amount of time has passed without receiving the selection, the user performs another action before selecting the new formula such as, for example committing the original formula, a determination may be made that the new formula was not selected. If the new formula was not selected, flow branches NO to operation 516 and the new formula is discarded. However, it is determined that the new formula is selected, flow branches YES to operation 518. At operation 518, the new formula replaces the original formula. In such examples, the partial original formula typed into the formula bar may be replaced by the partial new formula. The user may then provide additional input to complete the new formula.

Figure 6:
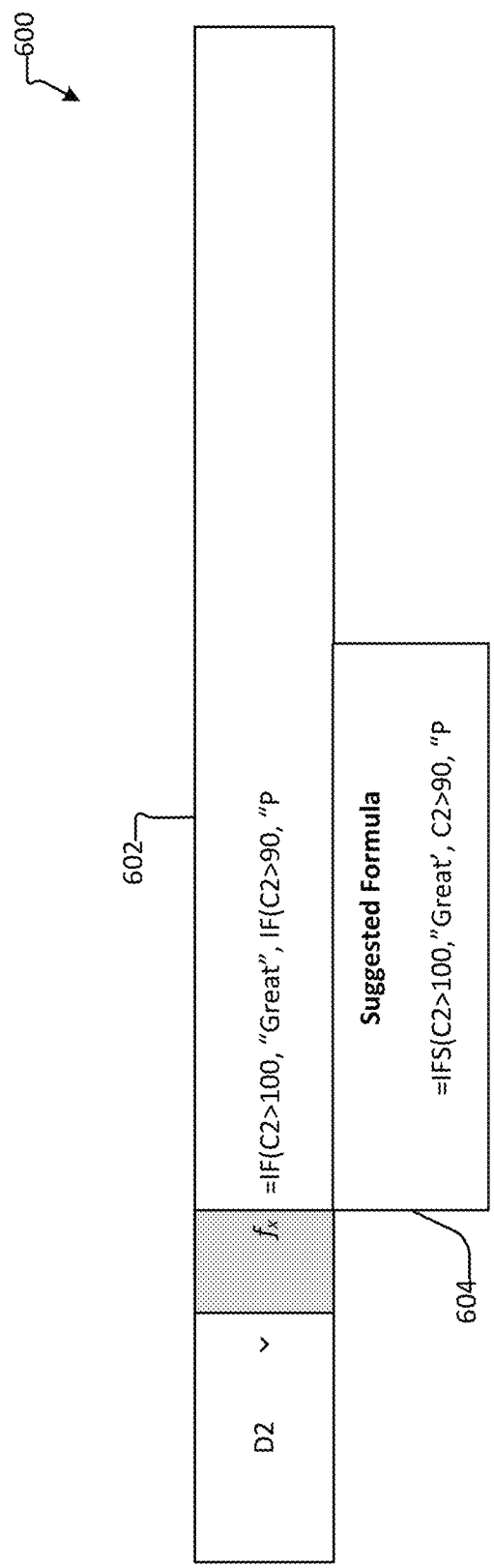
FIG. 6 illustrates an exemplary portion of a user interface for providing a newly constructed formula in real-time.

FIG. 6 illustrates an exemplary portion of a user interface 600 for providing a newly constructed formula in real-time. User interface 600 includes a formula bar 602. In the depicted example, input is currently being received in formula bar 602 defining a partial formula: IF(C2>100, "Great", IF(C2>90, "P. A suggested formula element 604 is also included. In the depicted example, the suggested formula element 604 is a drop down menu attached to the formula bar 602. In alternate examples, the suggested formula element 604 may take the form of a different type of UI element without departing from the spirit of this disclosure. The suggested element displays a partial new formula that is determined based upon the intent of the partial formula displayed in formula bar 602. The partial new formula may continue to be updated as additional input is received in the formula bar 602. The suggested formula element 604 is operable to receive a selection via an input interface, such as a keyboard, a mouse, a touchscreen, etc. Upon receiving input at suggested formula element 604, the partial formula displayed in formula bar 602 may be replaced by the partial suggested formula displayed in the suggested formula element 604.

Up to this point, the aspects disclosed herein relate to creating new formulas based upon intent while a spreadsheet application is in use. The aspects disclosed herein may also be employed to update formulas in existing spreadsheets that are not accessed by a user during the time of the update. For example, if a new version of a spreadsheet application is released having new formula functionality, it may be beneficial to automatically update existing spreadsheets to incorporate the new functionality by updating their old formulas.

Figure 7:
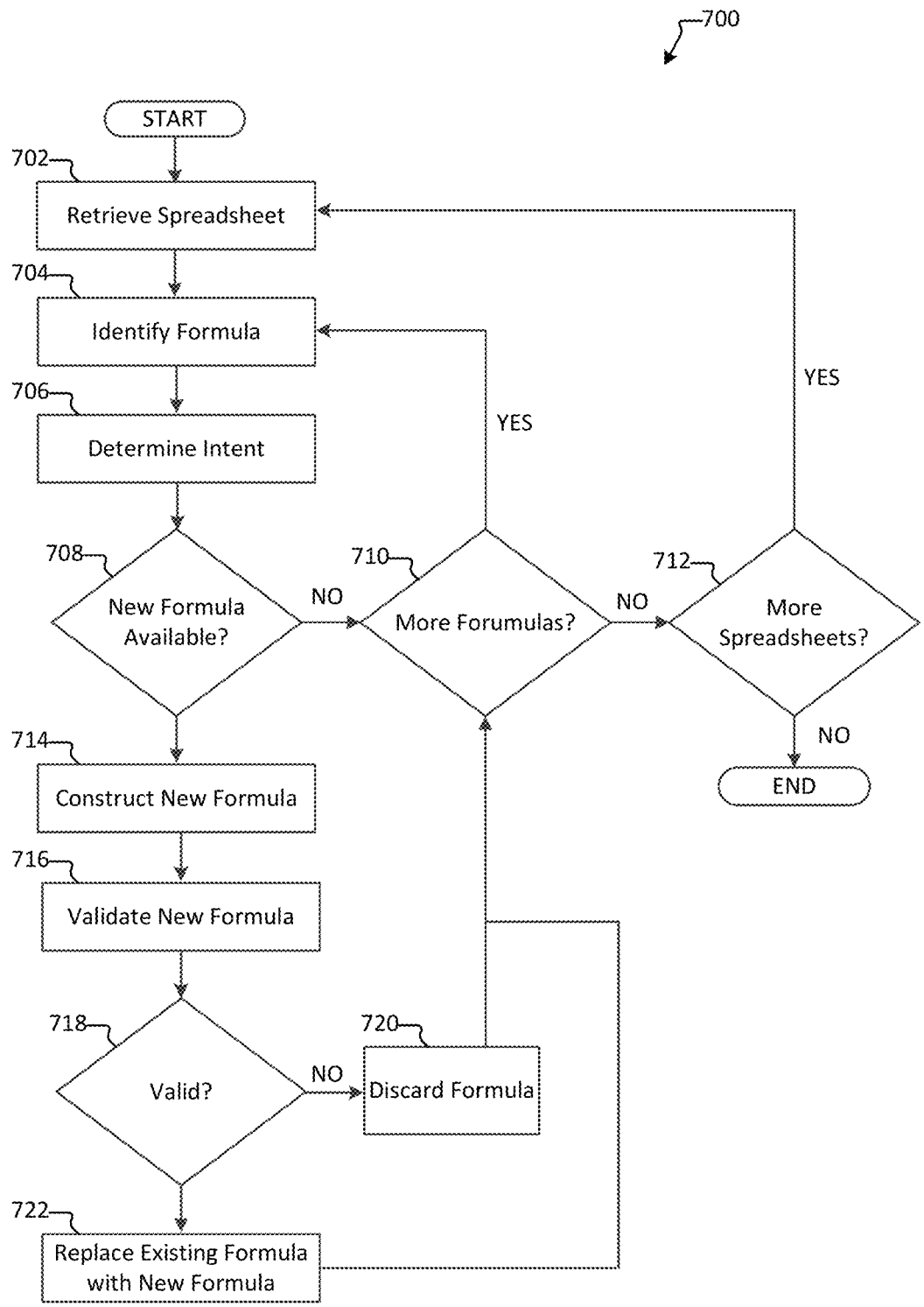
FIG. 7 provides an exemplary method for constructing new formulas for one or more files based upon intent.

FIG. 7 provides an exemplary method 700 for constructing new formulas for one or more files based upon intent. In aspects, method 700 may be executed on a device comprising at least one processor configured to store and execute operations, programs or instructions. However, method 700 is not limited to such examples. In other examples, method 700 may be performed on an application or service for generating new formulas. In at least one example, method 700 may be executed (e.g., computer-implemented operations) by one or more components of a distributed network, such as a web service/distributed network service (e.g. cloud service). For ease of explanation, the aspects of FIG. 7 are described with respect to operating upon spreadsheet files. However, one of skill in the art will appreciate that the teachings described herein are applicable to other types of files that include formulas.

Flow begins at operation 702 where a spreadsheet is retrieved by the device performing the method 700. In one example, the spreadsheet may be retrieved from a local data store or local memory. In an alternate example, the spreadsheet may be retrieved from a remote data store. The file retrieved may be identified based upon user input. Alternatively, an automated script may be employed to retrieve the spreadsheet at operation 702. Flow continues to operation 704 where a formula from the spreadsheet is identified. The formula may be identified by parsing the spreadsheet file to locate the formula. As previously discussed, a formula identified in the spreadsheet file may include one or more functions operating on one or more disparate datasets.

Once the formula is identified, flow continues to operation 706 were an intent is determined for the identified formula. The aspects described herein provide a variety of methods that maybe employed to determine an intent of a formula. The type of mechanism employed may be selected based upon the formula and/or underlying data associated with the formula. A single method may be employed to determine an intent. Alternatively, a number of the exemplary methods may be employed simultaneously or in parallel to determine an intent. While exemplary methods for determining an intent are disclosed herein, one of skill in the art will appreciate that other methods of determining intent may be employed by the aspects disclosed herein without departing from the scope of this disclosure. In certain aspects, the formulas may be parsed or tokenized to identify various different components. The different components may be analyzed individually and/or in combination to determine an intent for the formula.

Flow continues to decision operation 708 where a determination is made as to whether a newly constructed formula is available. As previously described, a new formula may be constructed based upon the determined intent of an original formal. The newly constructed formula is designed to satisfy the same intent as the original formula. Additionally, even if a newly constructed formula can be constructed, further evaluation may be performed to determine whether the newly constructed formula outperforms the original formula. A new formula may be considered to outperform the original formula if it is more readable than the original formula. Alternatively, or additionally, performance metrics such as processing time, resource requirements, etc. may be analyzed to determine whether the new formula outperforms the original formula. If a determination is made that a new formula does not exist that satisfies the original formula's intent, or if a new formula does exist but fails to outperform the existing formula, then it may be determined that a new formula is not available and flow branches NO to decision operation 710.

The aspects disclosed herein may evaluate more than one formula per spreadsheet. At decision operation 710, a determination is made as to whether the spreadsheet retrieved in operation 702 contains additional formulas that have not yet been analyzed. If additional formulas exist, flow branches YES and returns to operation 704 and the method 700 continues to analyze the additional functions of the spreadsheet. If, however, there are no other unevaluated formulas, flow branches NO to decision operation 712. In certain aspects, even if additional formulas are present in the spreadsheet, it may be computationally expensive to evaluate each formula. Under such circumstances, only a subset of the formulas may be analyzed. The subset may be determined by analyzing different factors such as the length of the formula, the number of other cells that depend on the formula, whether the formula is originally entered or simply copied, whether any other objects depend on the formula (e.g., a chart, a pivot table, etc.), whether the formula is used by a cell with special formatting on a sheet where many other cells and graphics are located, etc. Different weights may be assigned to the factors in order to help determine which formulas should be analyzed.

The method 700 may be capable of evaluating multiple spreadsheets. For example, the method may be employed to evaluate all spreadsheets in a directory or a domain. At decision operations 712, a determination is made as to whether there are additional spreadsheets that require processing. If additional spreadsheets exist, flow branches YES and returns to operation 702 where the next spreadsheet is retrieved. The method 700 then continues until there are no further spreadsheets to evaluate. Returning to operation 712, if there are no further spreadsheets that require evaluation, flow branches NO and the method 700 terminates.

Returning to decision operation 708, if it determined that a new formula is available, flow branches YES to operation 714. At operation 714, the determined intent is used to construct a new formula. For example, one or more new functions that satisfy the intent may be selected and combined into a new formula. Alternatively, or additionally, construction of a new formula at operation 714 may also include modifying underlying data associated with the original function. As such, in addition to identifying new functions, new parameters for the functions may be constructed and/or identified at operation 714. In certain aspects, creation of the new data structure may also include modifying the underlying data in order to convert the underlying data into a new data structure. In one aspect, one new formula may be constructed at operation 714. In other aspects, more than one formula may be constructed.

Flow continues to operation 716 where the new formula(s) are validated. One aspect of validating the newly created formula may include evaluating both the original formula and the newly created formula. The results of the evaluations may be compared. If the results are the same, the newly created formula is valid. If the results differ, the newly created formula is invalid and may be discarded. Alternatively, or additionally, validating the newly created formula may comprise evaluating the readability of the formula. In still further aspects, validation of the newly created formula may be based upon performance metrics. The newly compared formula may be executed and performance metrics can be collected during execution.

Flow continues to decision operation 718 were a determination is made to commit the new formula to the spreadsheet based upon the validation operation 716. If the new formula is not valid, flow branches NO to operation 720 where the new formula is discarded. Flow then returns to operation 710 and the method 700 continues until all the formulas have been validated. If the new formula is valid, however, flow branches YES to operation 722. At operation 722, the original formula may be replaced with the new formula. Flow then returns to operation 710 and the method 700 continues until all the formulas have been validated.

Figure 8:
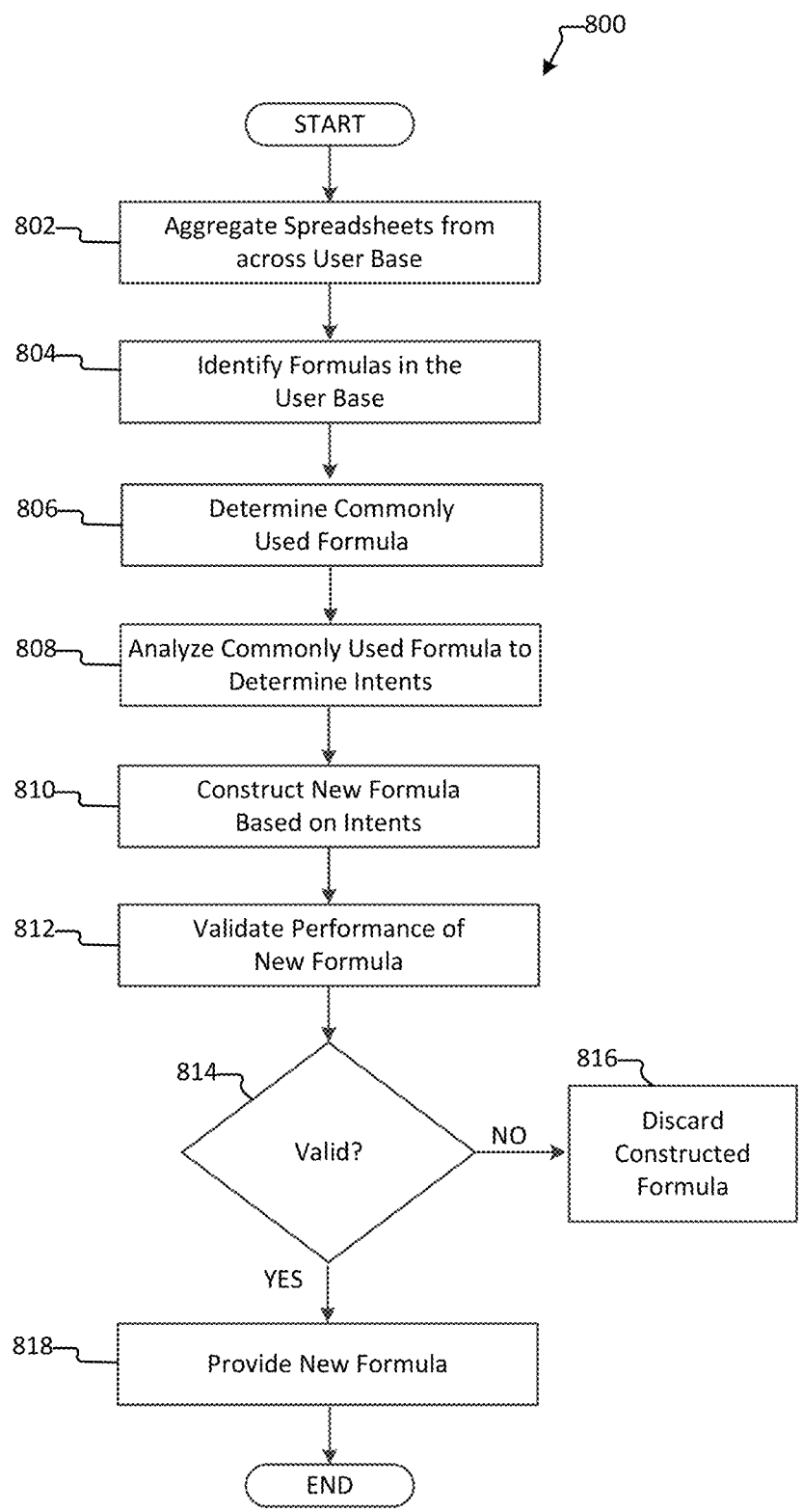
FIG. 8 provides an exemplary method for determining new formulas as a service.

Aspects disclosed herein may be scaled in order to collect and/or process spreadsheets from a large user base. In doing so, usage patterns can be analyzed to determine what types of formulas are intents are commonly performed among a group of users. This information may be processed, for example, using machine learning, in order to derive new formulas that more effectively satisfy the intent of many commonly used formulas. FIG. 8 provides an exemplary method for determining new formulas as a service. In aspects, method 800 may be executed on a device comprising at least one processor configured to store and execute operations, programs or instructions. However, method 800 is not limited to such examples. In other examples, method 700 may be performed on an application or service for generating new formulas. In at least one example, method 800 may be executed (e.g., computer-implemented operations) by one or more components of a distributed network, such as a web service/distributed network service (e.g. cloud service). For ease of explanation, the aspects of FIG. 7 are described with respect to operating upon spreadsheet files. However, one of skill in the art will appreciate that the teachings described herein are applicable to other types of files that include formulas.

Flow begins at operation 802 where spreadsheets are aggregated across a user base. In one example, aggregating spreadsheets may include accessing spreadsheets, or information about spreadsheets, across a network. In one example, spreadsheets from across various devices may be aggregated in a centralized location. Alternatively, rather than aggregating the entire spreadsheet, information about the spreadsheets, e.g., metadata, may be collected in a centralized location. In still further examples, aggregating spreadsheets may comprise aggregating the formulas used in the various spreadsheets in a centralized location.

Flow continues to operation 804 where functions from the aggregates spreadsheets, or the aggregated data about spreadsheets, may be identified. A formula identified in the spreadsheet file may include one or more functions operating on one or more disparate datasets. Additional information may also be collected when identifying the formulas. For example, additional information about the formulas may be collected that identify the spreadsheet associated with the formula, the user, contextual information about the formula, and the like. Upon aggregating the formulas, flow continues to operation 806 where the aggregated formulas are analyzed to determine common, repeating patterns. The identification of commonly used formulas may be used to prioritize the types of formulas that should be updated. Alternatively, or additionally, usage statistics about the formulas may be used to prioritize the order in which the formulas are analyzed. Given the large number of formulas that may be aggregates, identification of commonly used formulas may help determine how best to allocate resources when performing the intent analysis via a remote service.

Flow then continues to operation 810 where intents may be determined for the various aggregated formulas. The aspects described herein provide a variety of methods that maybe employed to determine an intent of a formula. The type of mechanism employed may be selected based upon the formula and/or underlying data associated with the formula. A single method may be employed to determine an intent. Alternatively, a number of the exemplary methods may be employed simultaneously or in parallel to determine an intent. While exemplary methods for determining an intent are disclosed herein, one of skill in the art will appreciate that other methods of determining intent may be employed by the aspects disclosed herein without departing from the scope of this disclosure. In certain aspects, the formulas may be parsed or tokenized to identify various different components. The different components may be analyzed individually and/or in combination to determine an intent for the formula.

The determined intent is used to construct one or more new formulas at operation 810. For example, one or more new functions that satisfy the intent may be selected and combined into a new formula. Alternatively, or additionally, construction of a new formula at operation 810 may also include modifying underlying data associated with the original function. As such, in addition to identifying new functions, new parameters for the functions may be constructed and/or identified at operation 810. In certain aspects, creation of the new data structure may also include modifying the underlying data in order to convert the underlying data into a new data structure.

Flow continues to operation 812 where the new formula(s) are validated. One aspect of validating the newly created formula may include evaluating both the original formula and the newly created formula. The results of the evaluations may be compared. If the results are the same, the newly created formula is valid. If the results differ, the newly created formula is invalid and may be discarded. Alternatively, or additionally, validating the newly created formula may comprise evaluating the readability of the formula. In still further aspects, validation of the newly created formula may be based upon performance metrics. The newly compared formula may be executed and performance metrics can be collected during execution.

Flow continues to decision operation 814 were a determination is made to provide the new formula(s) to the spreadsheets based upon the validation operation 812. If the new formula is not valid, flow branches NO to operation 816 where the new formula(s) are discarded. If the new formula(s) are valid, however, flow branches YES to operation 818. At operation 818, the new formulas are provided to the user base. In one example, providing the new formula(s) may include sending an update to the various spreadsheet applications associated with the user base. The updates may enable support for the newly created formulas. Alternatively, or additionally, providing the formula(s) may include automatically replacing original formulas with identical intents across the various spreadsheets in the user base.

FIGS. 9-12 and the associated descriptions provide a discussion of a variety of operating environments in which aspects of the disclosure may be practiced. However, the devices and systems illustrated and discussed with respect to FIGS. 9-12 are for purposes of example and illustration and are not limiting of a vast number of computing device configurations that may be utilized for practicing aspects of the disclosure, as described herein.

Figure 9:
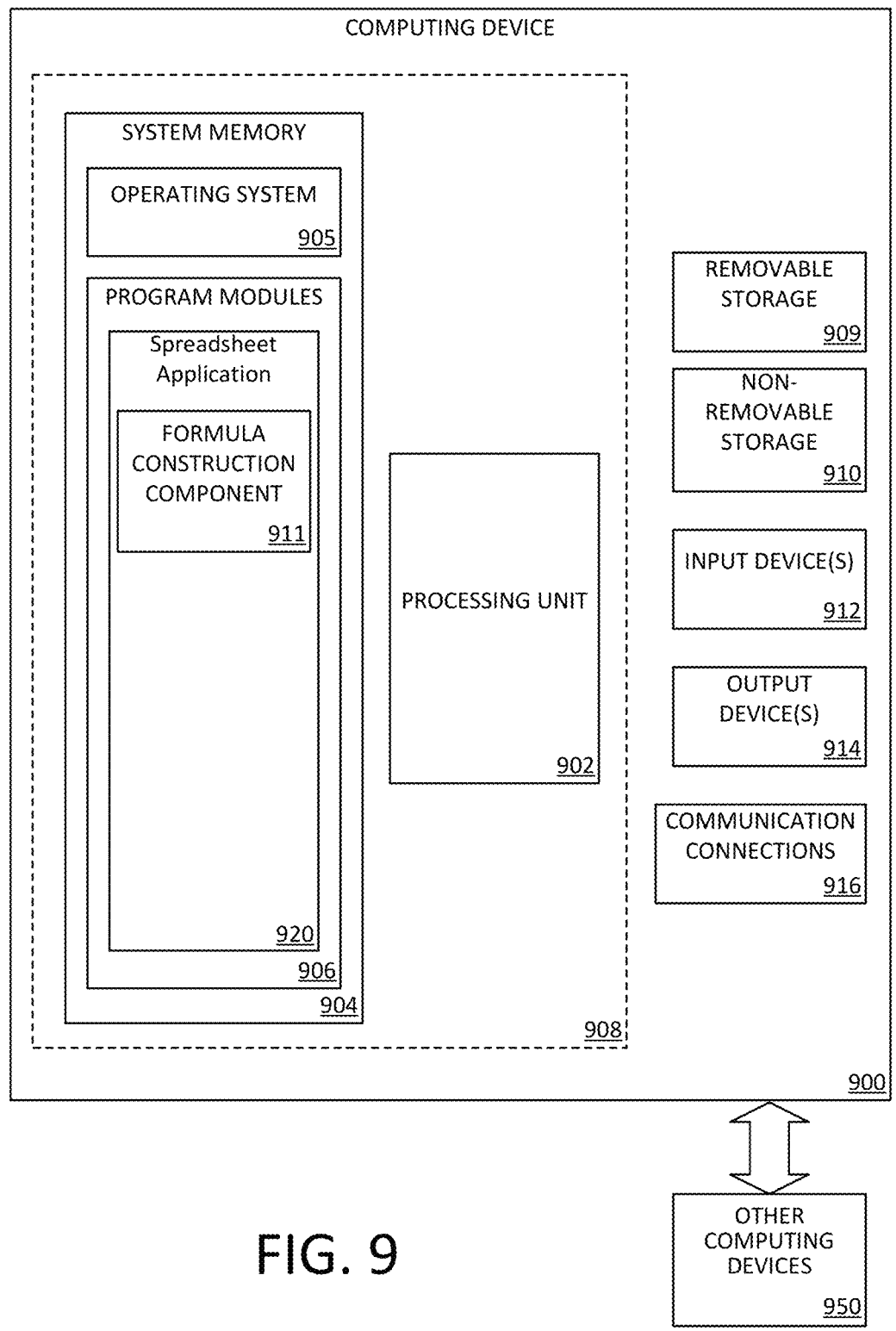
FIG. 9 is a block diagram illustrating example physical components of a computing device with which aspects of the disclosure may be practiced.

FIG. 9 is a block diagram illustrating physical components (e.g., hardware) of a computing device 900 with which aspects of the disclosure may be practiced. The computing device components described below may have computer executable instructions for implementing a spreadsheet application 920 on a computing device (e.g., server computing device 98 and/or client computing device 94), including computer executable instructions for spreadsheet application 920 that can be executed to implement the methods disclosed herein. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories. The system memory 904 may include an operating system 905 and one or more program modules 906 suitable for applications that display a navigable surface 920 and instructions to display and operate the navigable control UI elements disclosed herein.

The operating system 905, for example, may be suitable for controlling the operation of the computing device 900. Furthermore, embodiments of the disclosure may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 (e.g., spreadsheet application 920) may perform processes including, but not limited to, the aspects, as described herein. Other program modules that may be used in accordance with aspects of the present disclosure, and in particular formula construction component 911 which may perform the operations disclosed herein such as analyzing a formula, determining an intent, constructing a new formula based upon the determined intent, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 900 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 900 may also have one or more input device(s) 912 such as a keyboard, a mouse, a pen, a sound or voice input device, a touch or swipe input device, etc. The output device(s) 914 such as a display, speakers, a printer, etc. may also be included. The aforementioned devices are examples and others may be used. The computing device 900 may include one or more communication connections 916 allowing communications with other computing devices 950. Examples of suitable communication connections 916 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 10A:
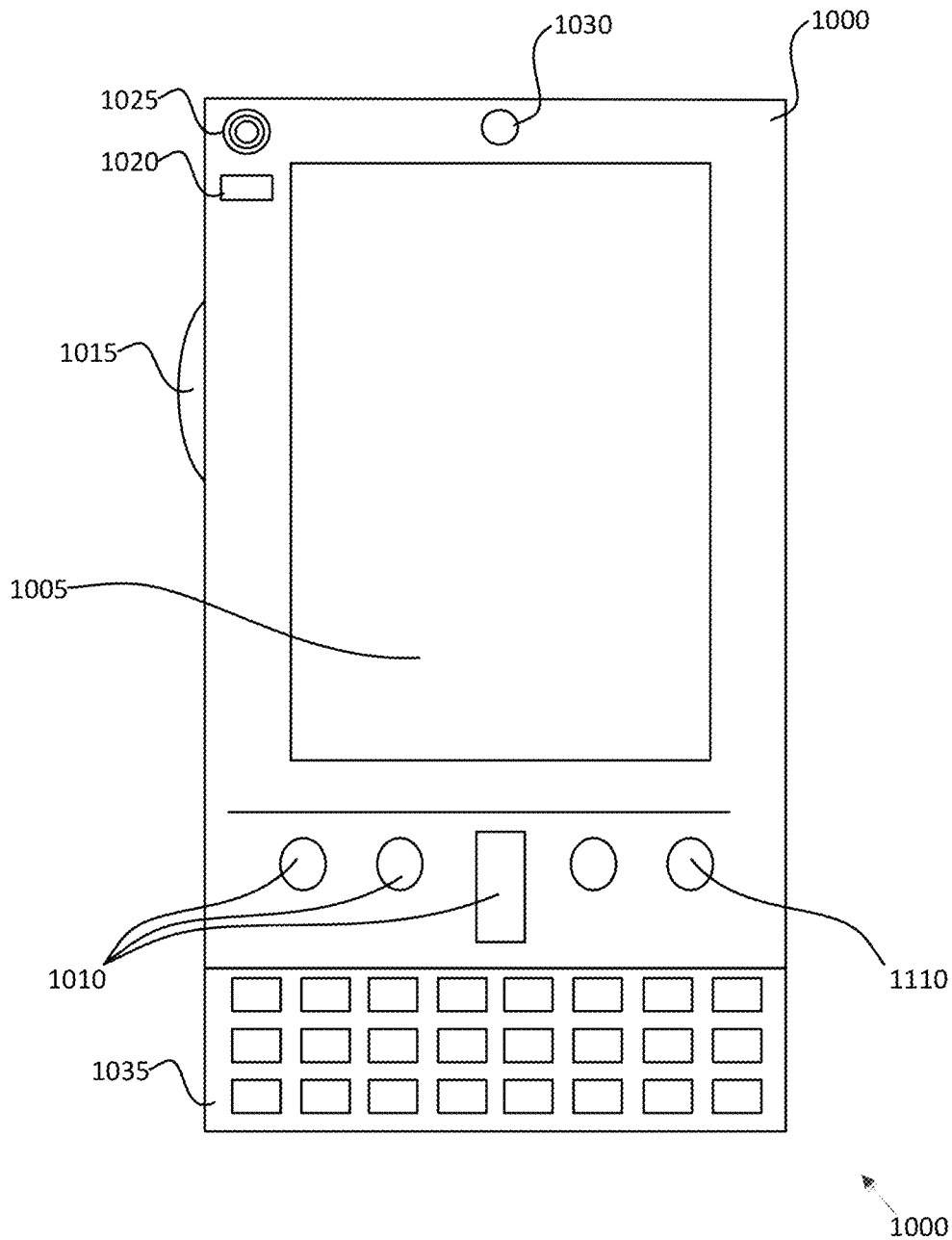
FIGS. 10A and 10B are simplified block diagrams of a mobile computing device with which aspects of the present disclosure may be practiced.
Figure 10B:
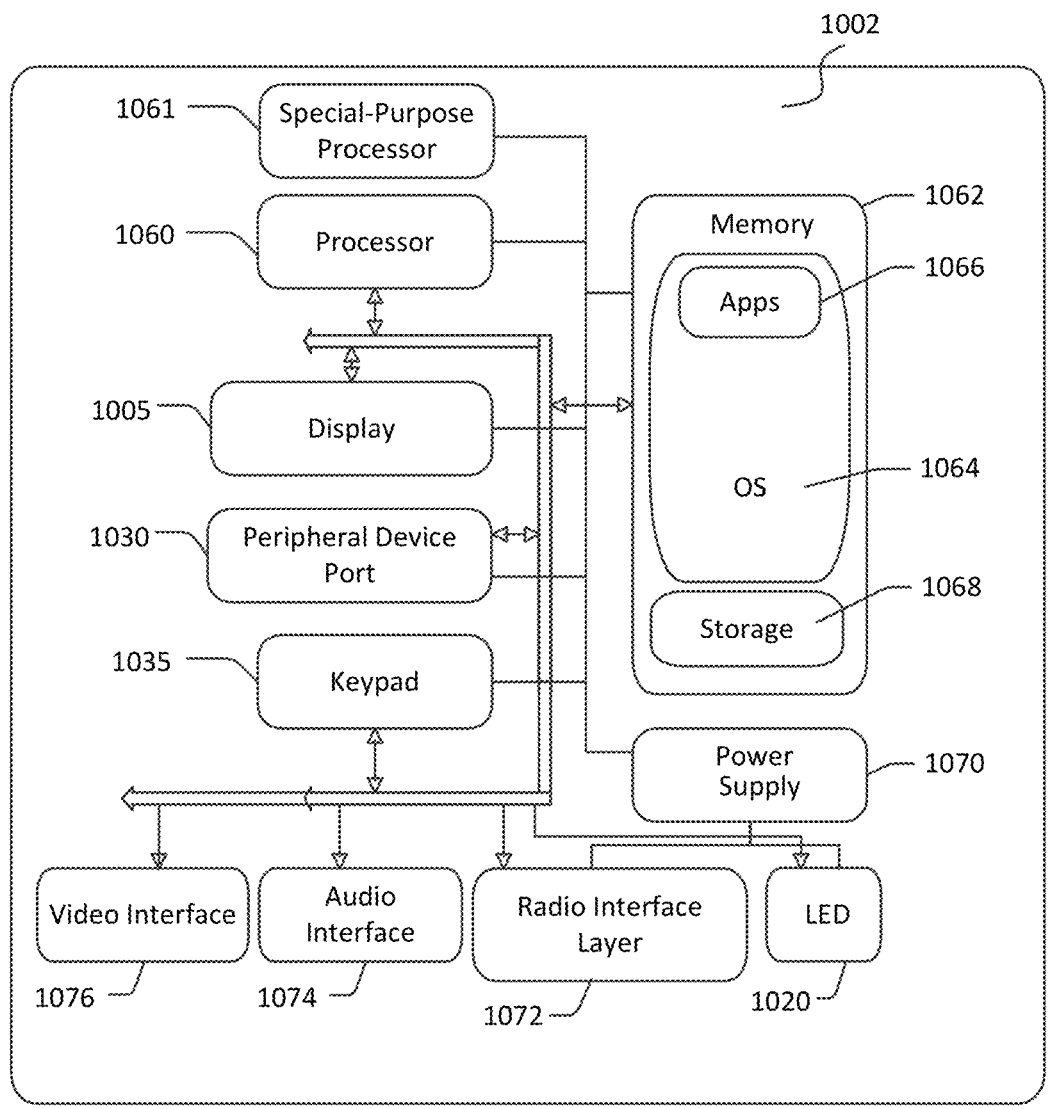

FIGS. 10A and 10B illustrate a mobile computing device 1000, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 10A, one aspect of a mobile computing device 1000 for implementing the aspects is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display). If included, an optional side input element 1015 allows further user input. The side input element 1015 may be a rotary switch, a button, or any other type of manual input element. In alternative aspects, mobile computing device 1000 may incorporate more or less input elements. For example, the display 1005 may not be a touch screen in some embodiments. In yet another alternative embodiment, the mobile computing device 1000 is a portable phone system, such as a cellular phone. The mobile computing device 1000 may also include an optional keypad 1035. Optional keypad 1035 may be a physical keypad or a "soft" keypad generated on the touch screen display. In various embodiments, the output elements include the display 1005 for showing a graphical user interface (GUI), a visual indicator 1020 (e.g., a light emitting diode), and/or an audio transducer 1025 (e.g., a speaker). In some aspects, the mobile computing device 1000 incorporates a vibration transducer for providing the user with tactile feedback. In yet another aspect, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 10B is a block diagram illustrating the architecture of one aspect of a mobile computing device. That is, the mobile computing device 1000 can incorporate a system (e.g., an architecture) 1002 to implement some aspects. In one embodiment, the system 1002 is implemented as a "smart phone" capable of running one or more applications (e.g., browser, e-mail, calendaring, contact managers, messaging clients, games, and media clients/players). In some aspects, the system 1002 is integrated as a computing device, such as an integrated personal digital assistant (PDA) and wireless phone.

One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as email or other messages used by an email application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000, including the instructions for associating one or more images with one or more cells of a spreadsheet as described herein (e.g., attribute component, associate component, array component, hybrid component, operation component, and/or UX component, etc.).

The system 1002 has a power supply 1070, which may be implemented as one or more batteries. The power supply 1070 may further include an external power source, such as an AC adapter or a powered docking cradle that supplements or recharges the batteries. The system 1002 may also include a radio interface layer 1072 that performs the function of transmitting and receiving radio frequency communications. The radio interface layer 1072 facilitates wireless connectivity between the system 1002 and the "outside world," via a communications carrier or service provider. Transmissions to and from the radio interface layer 1072 are conducted under control of the operating system 1064. In other words, communications received by the radio interface layer 1072 may be disseminated to the application programs 1066 via the operating system 1064, and vice versa.

The visual indicator 1020 may be used to provide visual notifications, and/or an audio interface 1074 may be used for producing audible notifications via an audio transducer 1025 (e.g., audio transducer 1025 illustrated in FIG. 10A). In the illustrated embodiment, the visual indicator 1020 is a light emitting diode (LED) and the audio transducer 1025 may be a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 1025, the audio interface 1074 may also be coupled to a microphone to receive audible input, such as to facilitate a telephone conversation. In accordance with embodiments of the present disclosure, the microphone may also serve as an audio sensor to facilitate control of notifications, as will be described below. The system 1002 may further include a video interface 1076 that enables an operation of peripheral device 1030 (e.g., on-board camera) to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 10B by the non-volatile storage area 1068.

Data/information generated or captured by the mobile computing device 1000 and stored via the system 1002 may be stored locally on the mobile computing device 1000, as described above, or the data may be stored on any number of storage media that may be accessed by the device via the radio interface layer 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio interface layer 1072 or via a distributed computing network. Similarly, such data/information may be readily transferred between computing devices for storage and use according to well-known data/information transfer and storage means, including electronic mail and collaborative data/information sharing systems.

As should be appreciated, FIGS. 10A and 10B are described for purposes of illustrating the present methods and systems and is not intended to limit the disclosure to a particular sequence of steps or a particular combination of hardware or software components.

Figure 11:
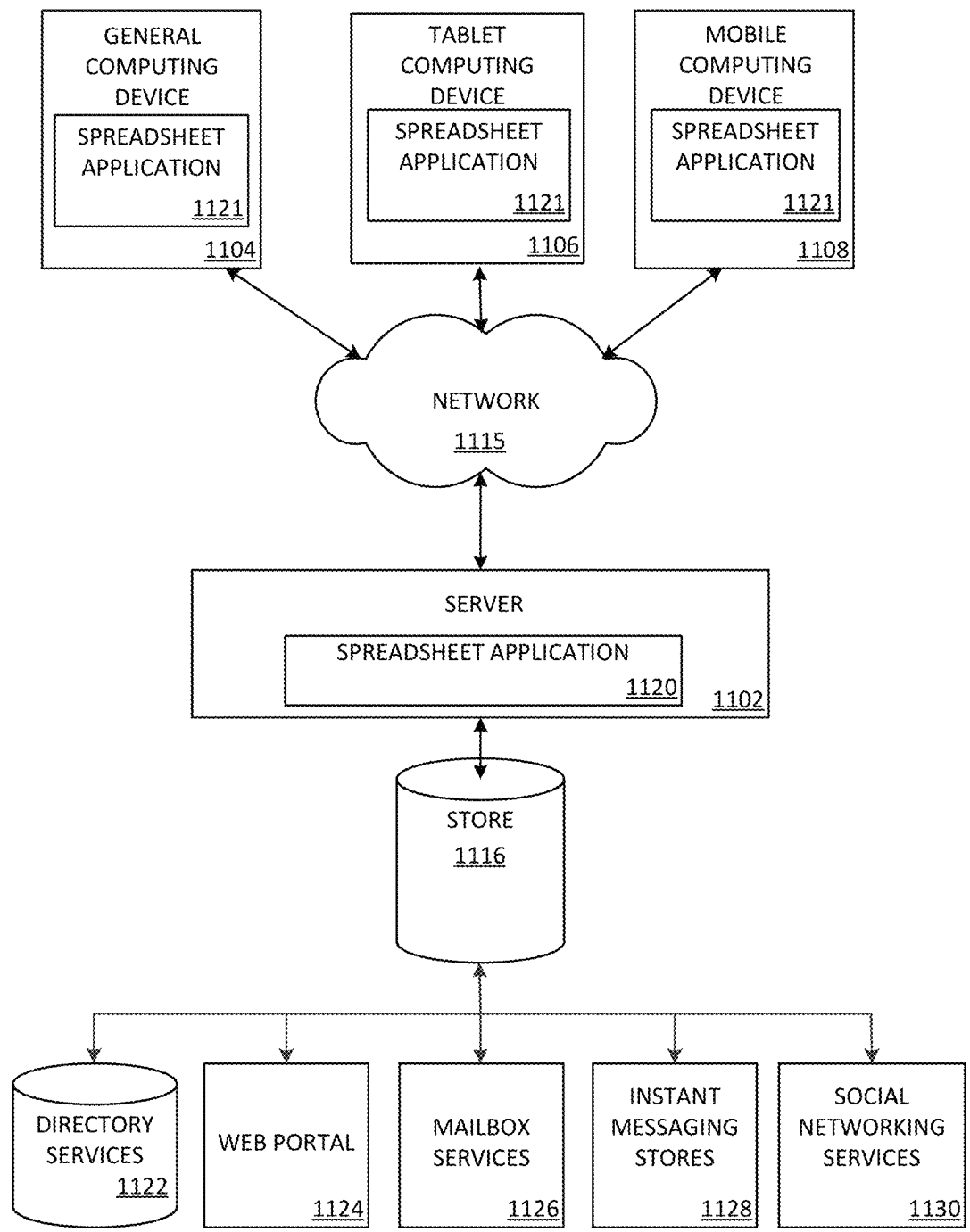
FIG. 11 is a simplified block diagram of a distributed computing system in which aspects of the present disclosure may be practiced.

FIG. 11 illustrates one aspect of the architecture of a system for processing data received at a computing system from a remote source, such as a general computing device 1104 (e.g., personal computer), tablet computing device 1106, or mobile computing device 1108, as described above. Content displayed at server device 1102 may be stored in different communication channels or other storage types. For example, various documents may be stored using a directory service 1122, a web portal 1124, a mailbox service 1126, an instant messaging store 1128, or a social networking service 1130. An application capable of constructing formulas, such as spreadsheet application 1121 may be employed by a client that communicates with server device 1102, and/or the spreadsheet application 1120 may be employed by server device 1102. The server device 1102 may provide data to and from a client computing device such as a general computing device 1104, a tablet computing device 1106 and/or a mobile computing device 1108 (e.g., a smart phone) through a network 1115. By way of example, the aspects described above with respect to FIGS. 1-14 may be embodied in a general computing device 1104 (e.g., personal computer), a tablet computing device 1106 and/or a mobile computing device 1108 (e.g., a smart phone). Any of these embodiments of the computing devices may obtain content from the store 1116, in addition to receiving graphical data useable to either be pre-processed at a graphic-originating system or post-processed at a receiving computing system.

As should be appreciated, FIG. 11 is described for purposes of illustrating the present methods and systems and is not intended to limit the disclosure to a particular sequence of steps or a particular combination of hardware or software components.

Figure 12:
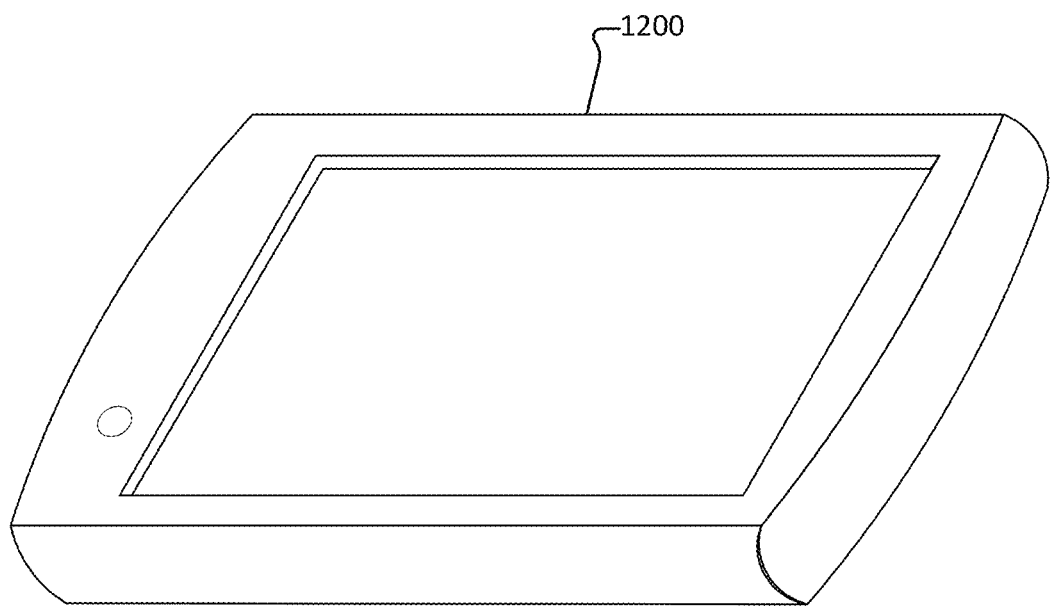
FIG. 12 illustrates a tablet computing device for executing one or more aspects of the present disclosure.

FIG. 12 illustrates an exemplary tablet computing device 1200 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 12 is described for purposes of illustrating the present methods and systems and is not intended to limit the disclosure to a particular sequence of steps or a particular combination of hardware or software components.

Among other examples, the present disclosure presents a system comprising: at least one processor; and memory encoding computer executable instructions that, when executed by the at least one processor, perform a method comprising: identifying an existing formula; analyzing the existing formula to determine an intent of the existing formula; constructing a new formula based upon the intent of the existing formula; and providing, via a user interface, the new formula. In further examples the method further comprises: computing the existing formula to determine a first result; computing the new formula to determine a second result; and prior to providing the new formula, validating the new formula by comparing the first result and the second result. In further examples, providing the new formula further comprises providing, via the user interface, audit information based upon the validation of the new formula. In further examples, the user interface is for a spreadsheet application and wherein the user interface comprises a formula bar. In further examples, the existing formula is displayed in the formula bar and wherein providing the new formula comprises displaying the new formula in a drop down menu adjacent to the formula bar. In further examples, wherein the method further comprises: receiving, via the user interface, a selection of the new formula; and in response to receiving the selection, committing the new formula. In further examples, committing the new formula comprises replacing the existing formula displayed in the formula bar with the new formula. In further examples, determining the intent comprise at least one of: analyzing one or more of the dependents or precedents of a formula; analyzing one or more of the neighboring cells of a formula; analyzing a result generated by computing the existing formula; analyzing one or more functions of the existing formula; analyzing one or more parameters of the existing formula; analyzing underlying data related to the existing formula; and performing natural language understanding.

Further aspects disclosed herein provide a method comprising: identifying one or more existing formulas in a spreadsheet, wherein the one or more existing formulas comprise at least one function; analyzing the one or more existing formulas to determine an intent of the one or more existing formulas; constructing a new formula based upon the intent of the one or more existing formulas, wherein the new formula satisfies the intent of the one or more existing formulas; providing, via a user interface, the new formula; determining whether a selection of the new formula has been received; and when the selection of the new formula has been received, committing the new formula. In further examples, the one or more existing formulas comprises at least two formulas, and wherein committing the new formula comprises replacing the at least two formulas with the new formula. In further examples, when the selection of the one or more existing formulas has not been received, discarding the new formula and maintaining the one or more existing formulas. Further examples comprise: determining a logical equivalence for the one or more existing formulas. In further examples, the method the method comprises validating the new formula, wherein validating the new formula comprises at least one of: determining a first readability score for the new formula; and determining one or more performance metrics for the new formula. In further examples, providing the new formula comprises: determining whether the one or more performance metrics for the new formula outperform performance metrics for the one or more existing formulas; and when the one or more performance metrics for the new formula outperform the performance metrics of the one or more existing formulas, providing the new formula. In further examples, providing the new formula comprises: determining whether the readability score for the new formula outperforms a second readability score for the one or more existing formulas; and when the readability score for the new formula outperforms the second readability score for the one or more existing formulas, providing the new formula.

Further aspects disclosed herein provide a computer storage medium encoding computer executable instructions that, when executed by at least one processor, perform a method comprising: identifying an existing formula in a spreadsheet, wherein the existing formula comprise at least one function; analyzing the existing formula to determine an intent of the formula; constructing a new formula based upon the intent of the existing formula, wherein the new formula satisfies the intent of the existing formula; providing, via a user interface for a spreadsheet application, the new formula; determining whether a selection of the new formula has been received; and when the selection of the new formula has been received, committing the new formula. In further examples, determining the intent comprise at least one of: analyzing one or more of the dependents or precedents of a formula; analyzing one or more of the neighboring cells of a formula; analyzing a result generated by computing the existing formula; analyzing one or more functions of the existing formula; analyzing one or more parameters of the existing formula; analyzing underlying data related to the existing formula; and performing natural language understanding. In further examples, the method further comprises: computing the existing formula to determine a first result; computing the new formula to determine a second result; and prior to providing the new formula, validating the new formula by comparing the first result and the second result. In further examples, the existing formula is displayed in the formula bar and wherein providing the new formula comprises displaying the new formula in a drop down menu adjacent to the formula bar. In further examples, the method further comprises: receiving, via the user interface, a selection of the new formula; and in response to receiving the selection, committing the new formula.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
  at least one processor; and
  memory encoding computer executable instructions that, when executed by the at least one processor, perform a method comprising:
    identifying an existing formula in a cell of a spreadsheet;
    parsing the existing formula into at least one component;
    recognizing, using automated pattern recognition, a pattern of the at least one component within the spreadsheet;
    constructing a new formula based upon the pattern;
    computing the existing formula to determine a first result;
    computing the new formula to determine a second result;
    validating the new formula by comparing the first result and the second result; and
    replacing, in the cell, the existing formula with the new formula.

2. The system of claim 1, wherein replacing the existing formula with the new formula further comprises providing, via a user interface, audit information based upon the validation of the new formula.

3. The system of claim 1, wherein the existing formula in the cell is displayed in a formula bar.

4. The system of claim 3, wherein the method further comprises displaying the new formula in a drop down menu adjacent to the formula bar.

5. The system of claim 4, wherein the method further comprises:
prior to replacing the existing formula with the new formula, receiving a selection of the new formula from the drop down menu.

6. The system of claim 1, wherein the automated pattern recognition comprises analyzing at least one of:
a dependent or precedent of the existing formula;
a neighboring cell of the existing formula;
a result generated by computing the existing formula;
a function of the existing formula;
a parameter of the existing formula;
underlying data related to the existing formula; and
natural language understanding.

7. A device-implemented method performed by a spreadsheet application, the device-implemented method comprising:
identifying an existing formula in a cell of a spreadsheet;
determining, using automated pattern recognition, an intent of the existing formula;
constructing a new formula based upon the intent of the existing formula;
when a selection of the new formula has been received, validating the new formula by:
determining a readability score of the new formula;
determining a performance metric of the new formula;
verifying a result of the new formula is equivalent to a result of the existing formula; or
any combination thereof; and
replacing, in the cell, the existing formula with the new formula.

8. The method of claim 7, wherein the cell is a first cell and the selection is a first selection, and the method further comprises:
identifying the existing formula in a second cell of the spreadsheet;
determining whether a second selection of the new formula has been received in associated with the second cell; and
when the second selection of the new formula has been received, replacing, in the second cell, the existing formula with the new formula.

9. The method of claim 8, the method further comprising, when the first selection of the new formula has been received and the second selection of the new formula has not been received:
replacing, in the first cell, the first existing formula with the new formula; and
maintaining, in the second cell, the second existing formula.

10. The method of claim 7, further comprising:
when the selection of the new formula has not been received, discarding the new formula and maintaining, in the cell, the existing formula.

11. The method of claim 7, wherein the new formula comprises a group of sub-formulas.

12. The method of claim 7, wherein replacing the existing formula with the new formula comprises:
determining that the performance metric for the new formula outperforms an existing performance metric for the existing formula.

13. The method of claim 7, wherein replacing the existing formula with the new formula comprises:
determining that the readability score for the new formula outperforms an existing readability score for the existing formula.

14. A computer storage medium encoding computer executable instructions that, when executed by at least one processor, perform a method comprising:
identifying an existing formula in a cell of a spreadsheet;
recognizing, using automated pattern recognition, a pattern among:
a dependent or precedent of the existing formula;
a neighboring cell of the existing formula;
a result generated by computing the existing formula;
a function of the existing formula;
a parameter of the existing formula;
underlying data related to the existing formula;
natural language understanding related to the existing formula; or
any combination thereof; and
providing a new formula constructed based upon the pattern.

15. The computer storage medium of claim 14, wherein the method comprises:
computing the existing formula to determine a first result;
computing the new formula to determine a second result; and
prior to providing the new formula, validating the new formula by comparing the first result and the second result.

16. The computer storage medium of claim 14, wherein the method further comprises:
when the existing formula is in the cell displaying the existing formula in a formula bar, and when the new formula is in the cell, displaying the new formula in the formula bar.

17. The computer storage medium of claim 14, wherein the method further comprises:
prior to providing the new formula, receiving a selection of the new formula.

* * * * *